United States Patent
Miura et al.

(10) Patent No.: US 7,457,102 B2
(45) Date of Patent: Nov. 25, 2008

(54) CAPACITOR AND METHOD FOR MAKING THE SAME

(75) Inventors: Teruhisa Miura, Kyoto (JP); Hideki Simamoto, Kyoto (JP); Tatehiko Inoue, Osaka (JP); Tsuyoshi Yoshino, Kyoto (JP)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 10/595,043

(22) PCT Filed: May 26, 2005

(86) PCT No.: PCT/JP2005/009641

§ 371 (c)(1),
(2), (4) Date: Jan. 12, 2006

(87) PCT Pub. No.: WO2005/117045

PCT Pub. Date: Dec. 8, 2005

(65) Prior Publication Data

US 2006/0156521 A1    Jul. 20, 2006

(30) Foreign Application Priority Data

| May 28, 2004 | (JP) | 2004-159140 |
| Dec. 17, 2004 | (JP) | 2004-365690 |
| Jan. 27, 2005 | (JP) | 2005-019412 |
| Feb. 16, 2005 | (JP) | 2005-038812 |

(51) Int. Cl.
*H01G 9/10* (2006.01)
*H01G 9/12* (2006.01)

(52) U.S. Cl. .................. 361/519; 361/521; 361/518

(58) Field of Classification Search .............. 361/502, 361/503, 508, 511–512, 516–521
See application file for complete search history.

(56) References Cited

U.S. PATENT DOCUMENTS 4,208,699 A * 6/1980 Philpott et al. .............. 361/519

(Continued)

FOREIGN PATENT DOCUMENTS

JP    H10/275751  A    10/1998

(Continued)

OTHER PUBLICATIONS

International Search Report of PCT/JP05/009641.

*Primary Examiner*—Eric Thomas
(74) *Attorney, Agent, or Firm*—Wenderoth, Lind & Ponack, L.L.P.

(57) ABSTRACT

A capacitor is provided to overcome the following problem: when plural capacitors are linked, a large coupling space is required because an anode and a cathode are brought out through the opposite ends, so that downsizing of the capacitor is difficult. The capacitor also allows easy electrical and mechanical coupling, reducing the required coupling space and unnecessary resistance. According to a structure of the capacitor, capacitor element (2) is enclosed in mechanical housing (3) having an opening sealed by terminal plate (4). Terminal slip (5), which includes rib (5*b*) to be coupled to one of the anode and the cathode of capacitor element (2) and terminal (5*a*), is insert-molded into terminal plate (4). The other of the anode and the cathode is coupled to an inner bottom face of metal housing (3). The one of the anode and the cathode is brought out through terminal (5*a*), and the other of the anode and the cathode is brought out through metal housing (3), thus a lower resistance is expected. When plural capacitors (1) are linked together, the coupling space is reduced by half, so that downsizing is achieved.

6 Claims, 20 Drawing Sheets

U.S. PATENT DOCUMENTS

| | | | |
|---|---|---|---|
| 6,282,081 B1 * | 8/2001 | Takabayashi et al. | 361/502 |
| 7,016,178 B2 * | 3/2006 | Erhardt et al. | 361/517 |
| 2003/0128500 A1 * | 7/2003 | Matsuoka et al. | 361/502 |
| 2006/0034036 A1 * | 2/2006 | Miura et al. | 361/511 |

FOREIGN PATENT DOCUMENTS

| | | |
|---|---|---|
| JP | 2000/269099 A | 9/2000 |
| JP | 2000/315632 A | 11/2000 |

* cited by examiner (Sectional view taken along line A-A in Fig.9B)

(Sectional view taken along line B-B in Fig.9B)

(Conventional capacitor)    (Invented capacitor)

(Conventional capacitor)   (Invented capacitor)

(Sectional view taken along line A-A in Fig.26B)

CAPACITOR AND METHOD FOR MAKING THE SAME

This application is a U.S. National Phase Application of PCT international application PCT/JP2005/009641, filed May 26, 2005.

TECHNICAL FIELD

The present invention relates to capacitors to be used for regenerating batteries of hybrid cars and fuel-cell powered vehicles, or for a power-storing purpose, and it also relates to methods of manufacturing the same capacitors.

BACKGROUND ART

FIG. 23 shows a sectional view illustrating a structure of a conventional capacitor to be used for applications similar to the foregoing ones. Capacitor element 20 is formed by rolling the following members: a pair of electrodes in a polarized electrode layer formed on a current collecting unit made of aluminum foil are prepared with a separator disposed between the pair of electrodes, and each of the pair of electrodes protrudes in opposite directions. To be more specific in FIG. 23, an end of a first electrode of the pair of electrodes protruding in opposite directions contacts the inner bottom face of metal housing 21, and an end of a second electrode of the pair contacts a face of lid 22 made of aluminum.

FIG. 23, viewed from the front, shows an anode and a cathode brought out from the top and the bottom, namely, the respective end faces of capacitor element 20. Capacitor element 20 and driving electrolyte (not shown) are enclosed in metal housing 21 made of aluminum, of which the bottom face has cathode terminal 21a for outer connection. An end face near to the cathode of capacitor element 20 is electrically and mechanically coupled to the inner bottom face of metal housing 21 by laser welding.

The conventional capacitor includes lid 22 made of aluminum, and lid 22 has anode terminal 22a for outer connection. An end face near to the anode of capacitor element 20 is electrically and mechanically coupled to an inner face of lid 22 by laser welding. An insulating member is disposed between the rim of lid 22 and opening 23 of metal housing 21, and those three elements are curled together for sealing.

As discussed above, the conventional capacitor has anode terminal 22a and cathode terminal 21a along the center axis of metal housing 21 (along the vertical direction in viewing FIG. 23 from the front), and both the terminals are used for connecting to an outer device. Use of coupling member 24 called a bus-bar for coupling anode terminal 22a to cathode terminal 21a (shown in FIG. 24) allows plural capacitors to be connected together, thereby forming a capacitor unit to be used in a vehicle-mounted backup power supply.

Prior art related to the present invention is disclosed in, e.g. Unexamined Japanese Patent Publication No. 2000-315632.

Use of conventional capacitors in a capacitor unit formed of plural capacitors coupled together as shown in FIG. 24 makes anode electrode terminal 22a be coupled to cathode electrode terminal 21a, and at that time respective terminals are brought out in opposite directions to each other. As previously described, coupling member 24 called a bus-bar couples anode terminal 22a and cathode terminal 21a together. This requires a cumbersome work, and coupling spaces h1 and h2 must be prepared at both the ends, so that an unexpectedly large mounting space is needed. As a result, the capacitor unit cannot be downsized.

The anode terminal and the cathode terminal can be brought out in the same direction for overcoming the foregoing problems. For example, a polarized electrode layer is formed on the current collecting unit made of aluminum foil. In such a construction, a pair of electrodes are coupled to lead members to the outside respectively, and the pair of electrodes are rolled, so that the anode electrode and the cathode electrode can be brought out in the same direction. However, the electrode is brought out from one spot (or plural spots) of a belt-like elongated electrode, so that a resisting component becomes greater than that of a structure called an end face current-collection, i.e. electrodes are brought out from the entire end face of capacitor element 20. This method is thus not always good for a capacitor unit formed by coupling plural capacitors together.

FIG. 25 shows a sectional view illustrating another structure of a conventional capacitor. FIGS. 26A, 26B, 26C and 26D show a structure of a terminal plate to be used in this capacitor, i.e. they are a perspective view of the surface of the plate, a perspective view of the inner face thereof, a sectional view taken along line A-A, and a sectional view taken along line B-B in FIG. 26B, respectively. In FIG. 25 and FIGS. 26A-26D, hollow section 40a is disposed at about the center of capacitor element 40. Although this is not shown in the drawings, capacitor element 40 includes a pair of electrodes, i.e. anode and cathode formed in a polarized electrode-layer on a current collecting unit made of aluminum foil. The anode and the cathode are shifted in opposite directions from each other, and a separator is disposed between them, and those three elements are rolled together (not shown). The anode and the cathode are brought out through either one of the end-faces of capacitor element 40 respectively (from the top and the bottom of FIG. 25 viewed from the front).

Capacitor element 40 and driving electrolyte (not shown) are housed in closed-end cylindrical metal housing 41 made of aluminum. Protrusion 41a is formed integrally with the inner bottom face of housing 41 such that it fits into hollow section 40a of capacitor element 40. Protrusion 41a is fitted into hollow section 40a, and then the end face of capacitor element 40 on the cathode side is coupled electrically and mechanically to the inner bottom face of housing 41 by laser welding.

Anode electrode 42a to be used for outer connection is unitarily formed with terminal plate 42 on the surface of plate 42 made of aluminum. On the end face of capacitor 40 on the anode side, coupling sections 42b are formed, protrusion 42c fitted into hollow section 40a of capacitor element 40 and safety valve mounting hole 42d working also as an electrolyte inlet are also provided. The end face on the anode side of capacitor element 40 is coupled mechanically and electrically to coupling sections 42b by laser welding. On the rim of terminal plate 42, an opening of metal housing 41 is curled together with sealing rubber 43 for sealing the opening.

The foregoing conventional capacitor allows anode terminal 42a to be brought out for external connection and allows the cathode terminal to be brought out through metal housing 41. Connection of a plurality of those capacitors forms a capacitor unit to be used as a vehicle-mounted backup power supply.

FIG. 27 shows a sectional view illustrating still another structure of the conventional capacitor of this kind. This capacitor has belt-like cathode terminal 44a to be used for outer connection and unitarily formed with the bottom plate of metal housing 44. Anode terminal 45a to be used for outer connection is extended to an outer rim of terminal plate 45 disposed on the top. The rim of plate 45 and an opening of metal housing 44 are curled together with an insulating member (not shown) in between for sealing. This is generally called a double curling process. Other structures than the foregoing ones remain unchanged from the capacitor shown in FIG. 25.

However, it is difficult to downsize the conventional capacitors because of the structure of terminal plate 42 (or terminal plate 45). In other words, as FIG. 26D details, in conventional terminal plate 42, an opening end of metal housing 41 is curled with sealing rubber 43 lying between the opening end and an outer rim of terminal plate 42, so that the outer rim is exposed outside. The top side to be sealed is referred to as a reference plane, and plural coupling sections 42b to be coupled to an end face of capacitor element 40 on the anode side are caved in from the reference plane, and the caved-in coupling sections are radially provided. The height between the end face of capacitor element 40 on the anode side and the upper end of metal housing 41 having undergone the curling process is an amount that is not negligible with respect to the total height of the capacitor. To be more specific, the height is a sum of a distance from the reference plane to coupling section 42b (equal to the caved-in depth) and a height of the processed sections both of the sealing rubber and metal housing 41.

In recent years, capacitors have been required to be downsized and yet to have a greater capacity, so that a greater height of capacitor element 40 cannot be allowed amid the environment where the height of capacitors are limited. As a result, it is extremely difficult to increase the capacity of capacitors as well as decrease the resistance thereof.

The present invention addresses the foregoing problems, and aims to provide capacitors that can be downsized, yet increase the capacity as well as decrease the resistance. The invention also provides a method of manufacturing the same capacitors.

SUMMARY OF THE INVENTION

The present invention provides a capacitor, in which a capacitor element and driving electrolyte are housed together in a metal housing, and an opening of the metal housing is sealed with a terminal plate. The terminal plate comprises the following elements:
  a rib coupled to one of the electrodes disposed in opposite directions of capacitor elements; and
  a terminal slip having a terminal to be used for connecting to an outer device,
  where the rib and the terminal slip are insert-molded using insulating resin.

A first electrode of the electrodes, disposed in opposite directions, of the capacitor elements is connected to the rib provided to the terminal slip formed on the terminal plate, and a second electrode is coupled to the inner bottom face of the metal housing. This structure allows one of the anode or the cathode to be brought out through a terminal provided to the terminal plate and to be used for connecting to an external device, and the remaining one, i.e. cathode or anode, to be brought out through the metal housing.

The foregoing construction allows the anode and the cathode to be brought out from the capacitor element directly via the end face of the element without using a lead member, so that a lower resistance can be expected. The anode and the cathode can be brought out to the outside from the terminal provided to the terminal plate and from the metal housing, so that a connecting space between respective capacitors can be reduced by half when plural capacitors are linked together to form a capacitor unit. As a result, the capacitor unit can be downsized advantageously with ease.

There is another capacitor of the present invention to solve the problems discussed previously. This capacitor comprises the following elements:
  a capacitor element including an anode and a cathode oriented in opposite directions;
  a metal housing connected to a first electrode of the electrodes of the capacitor element at its inner bottom face; and
  a terminal plate of which inner face is coupled to a second of the electrodes of the capacitor element.

An opening of the metal housing is sealed with this terminal plate. The terminal plate connects to the second electrode at its inner face which is referred to as a reference plane. The reference plane is elevated toward the surface side leaving the rim and plural belt-like coupling sections extending from the rim toward the center, and yet, a terminal to be used for connecting to an outer device is provided at the center of the surface outer side.

The foregoing structure allows the terminal plate to be constructed as follows: the reference plane, which is an inner face of the terminal plate and to be coupled to an electrode of the capacitor element, is elevated toward the surface side leaving the rim and plural belt-like coupling sections extending from the rim toward the center. Since the reference plane is a coupling section for coupling to the capacitor element, the height from the end face of the capacitor element on the anode side to the upper end of the metal housing having undergone the curling process can be extremely lowered. Thus capacitors of the same height can accommodate a higher capacitor element of the present invention than the conventional one. As a result, the present invention produces advantages such as a greater capacity and a lower resistance simultaneously.

Another capacitor of the present invention accommodates a capacitor element and driving electrolyte, and yet, either one of electrodes placed in opposite directions of the capacitor element is coupled to the inner bottom face. This capacitor also includes the following elements:
  a closed-end cylindrical metal housing which has an annular rim that has undergone a drawing process and resulted in having a V-shaped sectional view, and this drawing process holds down a rim of an end face of the electrode of the capacitor element from the outside; and
  a terminal plate having an inner face and being coupled to the remaining electrode of the two electrodes placed in opposite directions, thereby sealing the opening of the metal housing. This capacitor also includes a first insulating ring and a sealing ring made of rubber. This first insulating ring is provided to the metal housing at an upper end of drawing processed section, and placed between an outer wall of the terminal plate and an inner face of the metal housing. The first ring is extended to parts of the inner wall of the terminal plate. The sealing ring is provided to an outer rim of the surface of the terminal plate, and seals the metal housing by curling an end of the opening of the metal housing. In this capacitor, a ring-shaped insulating sheet is disposed such that it extends from the rim of the end face of the capacitor element at the terminal plate side to parts of the outer wall of the capacitor element, the outer wall extending from the rim. There is another insulating method: a portion of the inner wall of the metal housing is insulated, where the portion closely faces to at least the rim of the end face of the capacitor element at the terminal plate and parts of the outer wall extending from the rim.

As discussed above, the capacitor of the present invention can prevent an electrical short because an insulating member is disposed between the rim of the end face of the capacitor element on the anode side and the inner wall of the metal housing. As a result, capacitors (not shown) excellent in electrical performance are advantageously obtainable.

Still another capacitor of the present invention includes a capacitor element having the following structure: a pair of electrodes, i.e. an anode and a cathode, comprising polarized electrode layers formed on a current collecting unit made of metal foil and rolled together with a separator placed between the anode and the cathode, and the anode is oppositely oriented to the cathode. This capacitor element and driving electrolyte are housed in a closed-end metal housing, of which an inner bottom face is coupled to a first electrode of the electrodes oriented oppositely to each other in the capacitor element. The capacitor also includes a terminal plate, of which the inner face is coupled to a second electrode of the electrodes oriented oppositely to each other, and the terminal plate seals the opening of the metal housing. Thus the first electrode of the capacitor element is brought out through the metal housing, and the second electrode is brought out through a terminal for external connection provided to the terminal plate. Two pieces of this capacitor are put into one unit such that different polarities are adjacent to each other, and this one unit is coupled electrically and mechanically to a similar unit with a connecting plate.

As discussed above, the capacitor of the present invention has its anode and cathode brought out from an end face of the capacitor element directly without using a lead member, thereby lowering the resistance. The anode and the cathode can be brought out to the outside from the terminal disposed on the terminal plate and the metal housing, so that when the capacitors are linked together to form a capacitor unit, the connecting space between the individual capacitors can be reduced by half. As a result, the capacitor unit can be downsized advantageously with ease.

DETAILED DESCRIPTION OF PREFERRED EMBODIMENTS

Embodiment 1

Figure 1:
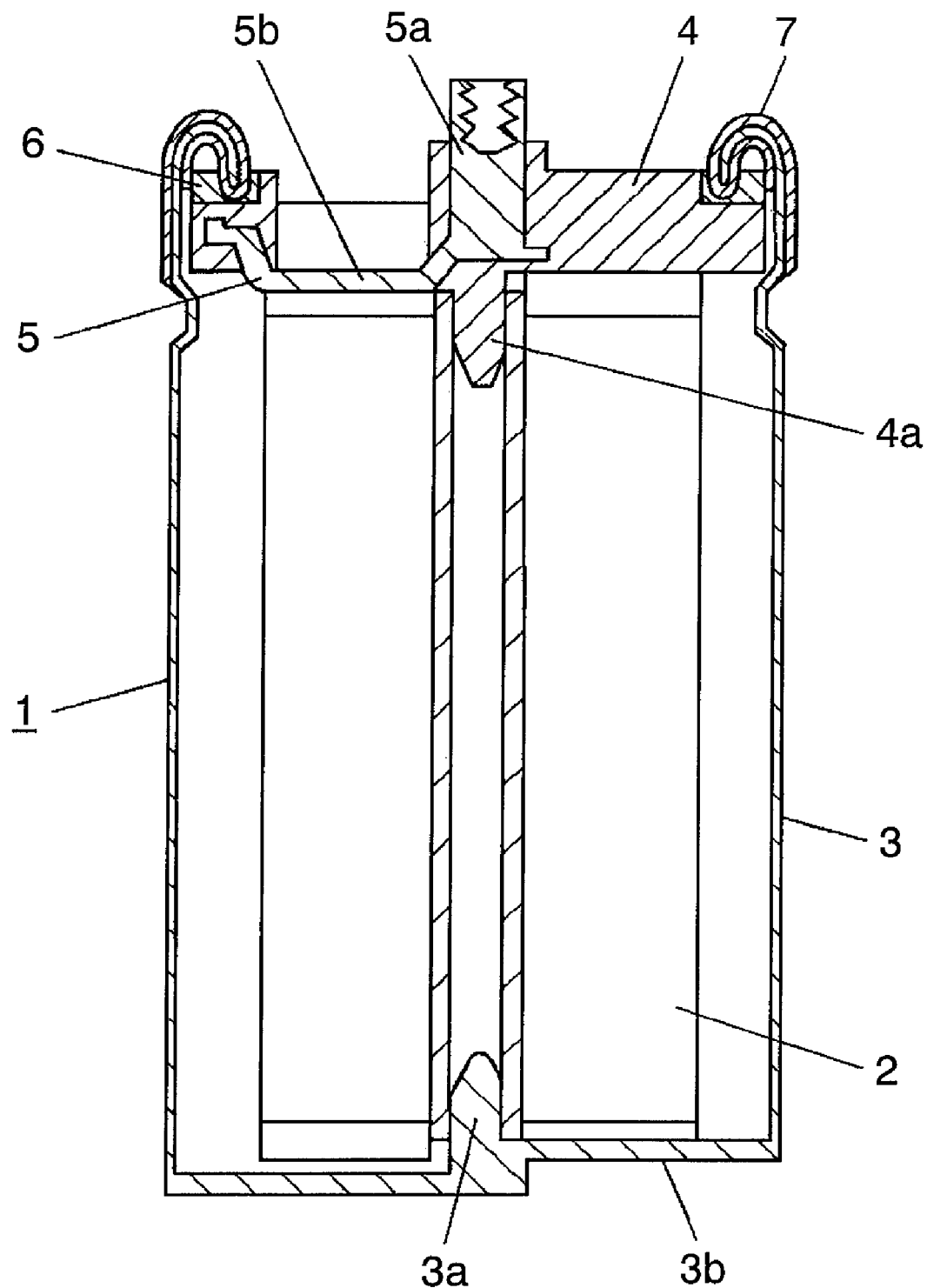
FIG. 1 shows a sectional view illustrating a structure of a capacitor in accordance with a first embodiment of the present invention.
Figure 2:
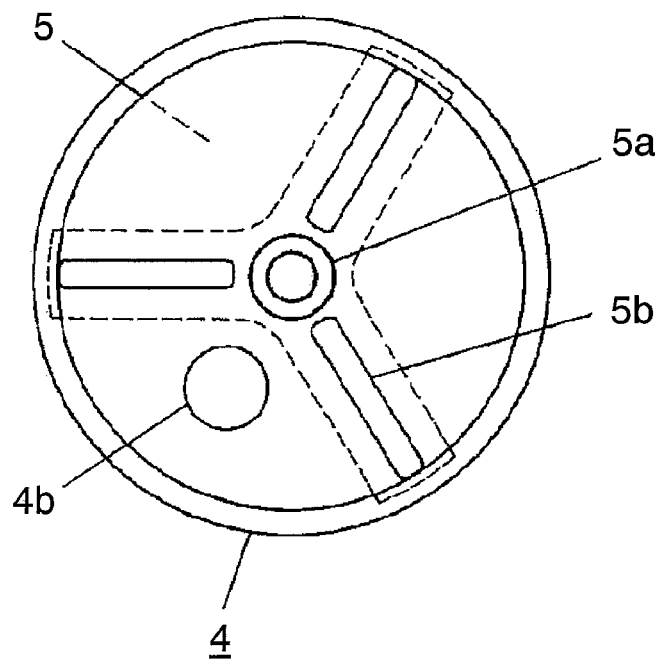
FIG. 2 shows a plan view of a terminal plate to be used in the capacitor shown in FIG. 1.
Figure 3:
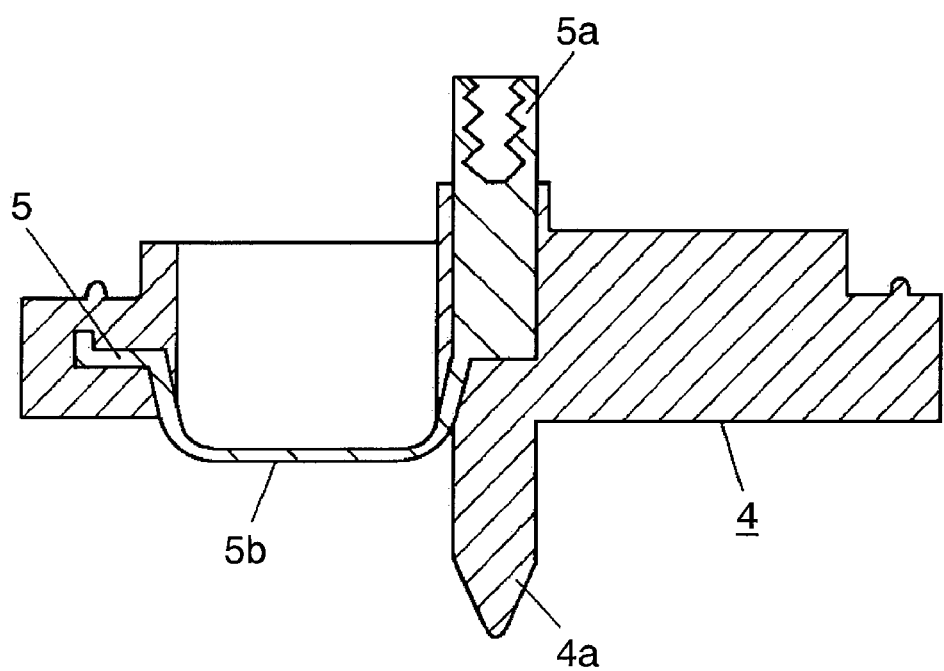
FIG. 3 shows a sectional view of the terminal plate to be used in the same capacitor.
Figure 4:
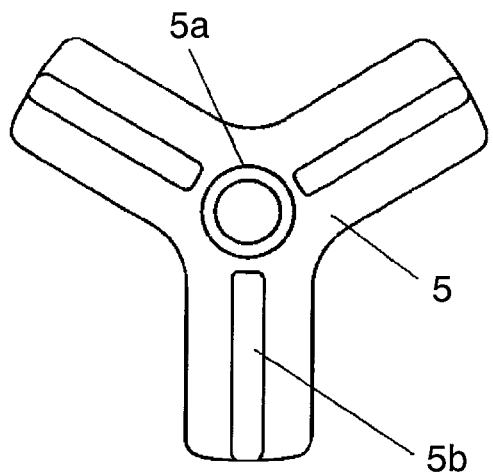
FIG. 4 shows a plan view of a terminal slip to be insert-formed into the same terminal plate.

FIG. 1 shows a sectional view illustrating a structure of a capacitor in accordance with the first embodiment of the present invention. FIG. 2 shows a plan view of a terminal plate to be used in the capacitor. FIG. 3 shows a sectional view of the terminal plate. FIG. 4 shows a plan view of a terminal slip to be insert-formed into the terminal plate. In FIGS. 1-4, capacitor 1 includes capacitor element 2, which has a pair of electrodes (not shown) forming a polarized electrode layer of which major ingredients are activated carbon and binder. The polarized electrode layer is formed on a current collecting unit made of aluminum foil such that the current collecting unit exposes itself at its one end. The pair of electrodes is formed by rolling the exposed section of the current collecting unit such that the exposed section is oriented in opposite directions and a separator (not shown) is disposed between the exposed sections oriented oppositely. The anode and the cathode of the pair of electrodes are placed at the top and at the bottom of the capacitor shown in FIG. 1 viewed from the front.

Capacitor 1 includes closed-end cylindrical metal housing 3 made of aluminum, and housing 3 accommodates capacitor element 2 and driving electrolyte (not shown). Metal housing 3 has protrusion 3a on the center of its inner bottom face, and protrusion 3a is inserted into a hollow, i.e. an air-core of the roll of capacitor element 2, so that capacitor element 2 is rigidly positioned. Metal housing 3 also has rib 3b protruding in part from the inner bottom face, and rib 3b is coupled mechanically and electrically to an end face of capacitor element 2 on the cathode side by joint means such as laser welding, metal spraying or brazing.

FIG. 2 shows a plan view of terminal plate 4, which is formed by insert-molding terminal slip 5 made of aluminum by using insulating resin (phenol or PPS). Terminal slip 5 includes terminal 5a for outer connection. Terminal plate 4 includes safety-valve mounting hole 4b which also functions as an inlet for the driving electrolyte (not shown). After the electrolyte is poured, the safety valve is mounted. As shown in FIG. 3, terminal plate 4 has protrusion 4a at its center of the underside, and protrusion 4a is to be inserted into the hollow which is an air-core of the roll of capacitor element 2.

Terminal slip 5 also has ribs 5b protruding downward in part, i.e. groove-like ribs, which are placed radially. Tops of ribs 5b contact with an end face of capacitor element 2 on the anode side, and the contacting sections are welded by laser for achieving a mechanical and electrical joint. As a result, the anode can be brought out through terminal 5a.

Annular sealing rubber 6 (refer to FIG. 1) is provided to the rim of the upper face of terminal plate 4, and rubber 6 is fitted into an opening of metal housing 3 together with terminal plate 4. Then the vicinity of the opening undergoes a drawing process, and an end of the opening is curled for sealing. In curling, the end of opening of housing 3 bites rubber 6, so that the opening can be sealed more positively.

In providing a drawing process to the vicinity of the opening as well as curling the opening in order to seal housing 3, the outer wall of housing 3 is urged at its upper section toward the center, so that terminal plate 4 and housing 3 solidly contact each other during those processes. As a result, the driving electrolyte is prevented from leaking outside, and housing 3 is kept highly airtight.

Insulating layer 7 provided to inside the opening end of housing 3 can prevent the electrolyte from creeping up due to a capillary phenomenon and reacting on sealing rubber 6, so that insulating layer 7 prevents rubber 6 from weakening.

Capacitor 1 in accordance with the first embodiment as discussed above allows an end face of capacitor element 2 on the anode side to connect to ribs 5b of terminal slip 5 provided to terminal plate 4 (in general, referred to as "collecting current on an end face"). This structure allows the end face on the anode side to connect to terminal 5a provided to terminal plate 4 for outer connection as well as another end face on the cathode side to connect to the inner bottom face of metal housing 3 (in general, referred to as "collecting current on an end face"). The anode and the cathode of capacitor element 2 can be brought out by the method of "collecting current on an end face". Since the anode connects to terminal 5a with a minimum distance via terminal slip 5, unnecessary resistance is reduced, and capacitor 1 having a lower resistance is thus obtainable.

The anode and the cathode can be brought out through terminal 5a provided to terminal plate 4 and through metal housing 3. This structure solves the following two conventional inconveniences simultaneously when plural capacitors are linked to each other for forming a capacitor unit: a cumbersome joining process because respective terminals are brought out in opposite directions; and a large mounting space resulting from respective joint spaces needed at both ends, which prevents downsizing of the capacitor unit.

In this first embodiment, the anode of capacitor element 2 connects to terminal 5a via terminal slip 5 disposed on terminal plate 4, and the cathode connects to metal housing 3. However, the present invention is not limited to this structure. For instance, the anode and the cathode can be placed oppositely to what is discussed above.

In this first embodiment, cylindrical capacitor 1 is described; however, the present invention is not limited to this structure and, for instance, capacitor 1 can be an oval-shaped one or an angular-shaped one.

Plural ribs 5b are disposed for laser-welding terminal slip 5 of terminal plate 4 to an end face of capacitor element 2 on the anode side; however, the present invention is not limited to this structure and, for instance, one rib 5b can work, or no rib 5b can also work.

Embodiment 2

The second embodiment presents a capacitor unit formed by linking a plurality of the capacitors to each other in accordance with the first embodiment. Similar elements to those used in the first embodiment have the same reference characters, and the descriptions thereof are omitted, while only different ones are described hereinafter with reference to FIG. 5.

Figure 5:
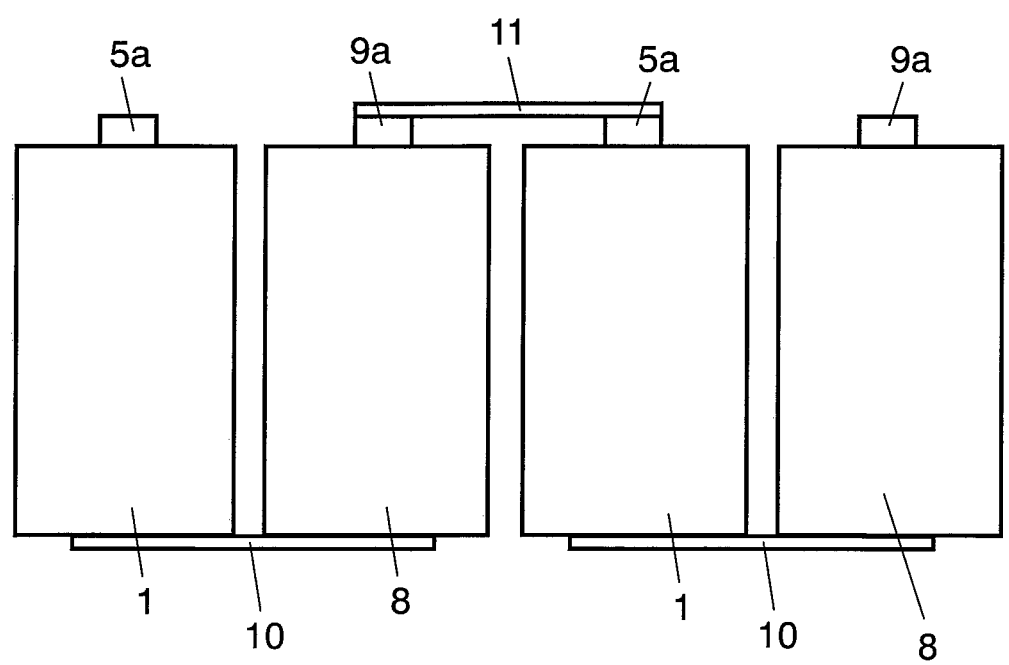
FIG. 5 shows a front view illustrating a structure of a capacitor unit in accordance with a second embodiment of the present invention.

FIG. 5 shows a front view illustrating a structure of a capacitor unit in accordance with the second embodiment of the present invention. Capacitor 1 has the same structure as the one in accordance with the first embodiment, and includes terminal 5a connected to an anode of a capacitor element (not shown). Capacitor 1 is adjacent to capacitor 8 which has terminal 9a connecting to a cathode of a capacitor element.

Capacitor 1 is brought out its anode from terminal 5a and its cathode from its metal housing. Capacitor 8 has its anode brought out from its metal housing and its cathode from terminal 9a. The metal housings of two kinds of capacitors 1 and 8 are coupled in series with coupling member 10. Terminals 9a and 5a of capacitors 1 and 8 are coupled in series with coupling member 11. Coupling member 10 is preferably connected by welding or conductive adhesive, and coupling member 11 is preferably connected by screwing.

As discussed above, in the second embodiment, two kinds of capacitors 1 and 8, of which anodes and cathodes are brought out in different manners, are prepared, and the two capacitors are simply coupled in series with coupling members 10 and 11 for doubling the capacity. The two kinds of capacitors coupled in series have the anode and the cathode brought out from terminals 5a and 9a, so that they can be brought out in the same direction. As a result, when plural capacitors 1 and 8 are linked to form a capacitor unit, a joint space between respective capacitors can be reduced by half.

Embodiment 3

The third embodiment presents a case where the capacitor element in accordance with the first embodiment has a coupling method for its anode and cathode that is partly different than the method demonstrated in embodiment 1. Other than this point, this third embodiment remains unchanged from embodiment 1, and similar elements to those in embodiment 1 have the same reference characters and the descriptions thereof are omitted here. Elements different from embodiment 1 are demonstrated hereinafter with reference to FIGS. 6A, 6B, and 7.

Figure 6A:
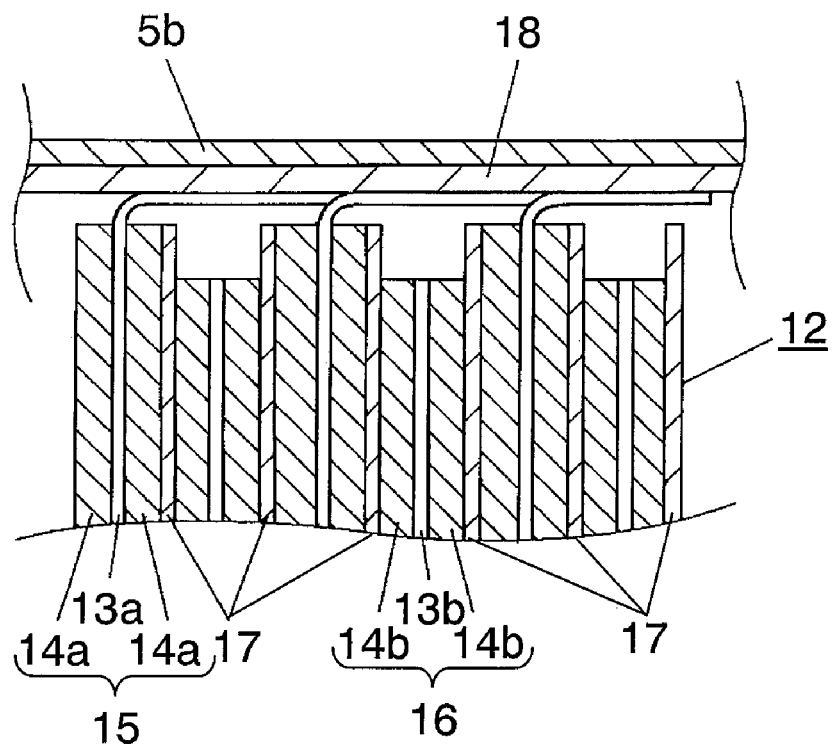
FIG. 6A shows a sectional view illustrating a structure of an essential part of a capacitor, before its anode is coupled to a coupling member, in accordance with a third embodiment of the present invention.
Figure 6B:
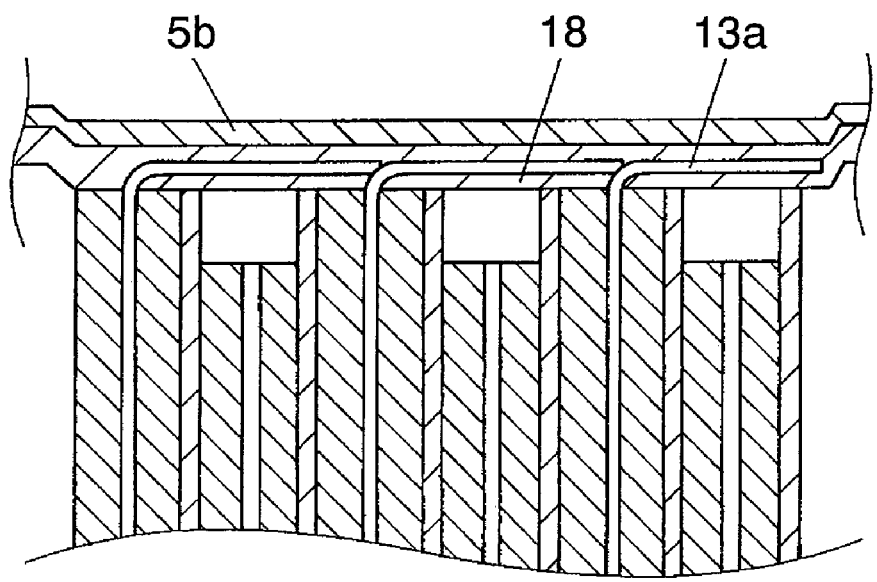
FIG. 6B shows a sectional view of an essential part of the capacitor, after the anode is coupled to the coupling member, in accordance with the third embodiment of the present invention.

FIGS. 6A and 6B show sectional views illustrating structures of essential parts of capacitors in accordance with the third embodiment of the present invention. Capacitor element 12 is formed of the following elements:

anodes 15 having polarized electrode layer 14a formed on the surface of current collecting unit 13a made of aluminum foil;

cathodes 16 having polarized electrode layer 14b formed on the surface of current collecting unit 13b made of aluminum foil; and separator 17 placed between anode 15 and cathode 16, where each one of anodes 15 and each one of cathodes 16 are shifted from each other in opposite directions, and those three elements are rolled together.

FIGS. 6A and 6B show enlarged views of the end face of the anode.

Terminal slip 5 insert-molded into terminal plate 4 is provided with groove-like rib 5b, of which the face is covered with brazing member 18. In this third embodiment, aluminum solder is used as brazing member 18. The aluminum solder used in the third embodiment is formed mainly of aluminum and silicon, and its melting point is 586±6° C. However, the present invention is not limited to this material. As shown in FIG. 6A, an end face of capacitor element 12 on the anode side is brought into contact with brazing member 18 provided on rib 5b, and then the end face and brazing member are welded by laser, so that the anode of capacitor element 12 can be coupled to rib 5b.

Therefore, when the aluminum that forms terminal slip 5 having rib 5b, is welded by laser to the aluminum that forms current collecting unit 13a, brazing member 18 intervenes there. This method allows melting of brazing member 18, whose melting point is lower than that of aluminum, in an early stage, so that current collecting unit 13a is wrapped by melted brazing member 18 as shown in FIG. 6B. The end face on the anode side adheres solidly to brazing member 18, so that joint strength is enhanced, which advantageously increases the resistance against vibration.

Figure 7:
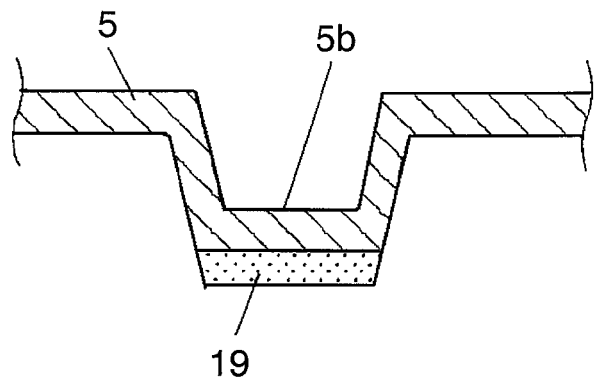
FIG. 7 shows a sectional view illustrating a structure of an essential part of a terminal slip in accordance with the third embodiment of the present invention.

A method of applying this brazing member 18 between rib 5b and capacitor element 2 is this: e.g. the end face of element 12 on the anode side is dipped into brazing-member 18, or brazing-member 18 is stuck on the outer face of rib 5b formed on terminal slip 5. There is another method as shown in FIG. 7, i.e. a cladding method which forms aluminum solder 19 on the outer face of rib 5b provided to terminal slip 5. This cladding structure allows aluminum solder 19 to lie only at a necessary place to be laser-welded, so that joint accuracy, joint reliability and work efficiency can be greatly improved.

The third embodiment uses brazing member 18 (or aluminum solder 19) intervening between the end face of capacitor element 12 on the anode side and rib 5b formed on terminal slip 5 for laser-welding. However, the present invention is not limited to this structure, yet, this structure can be also used for coupling an end face of element 12 on the cathode side to an inner bottom face of metal housing 3.

Embodiment 4

The fourth embodiment presents a different structure in the capacitor element in accordance with the first embodiment. The other points remain unchanged from that of the first embodiment, so that the detailed descriptions thereof are omitted and only the different points are described hereinafter.

A capacitor element used in this fourth embodiment has a polarized electrode layer, in which the electrodes are formed, over a current collecting unit without exposing any of the current collecting unit. A pair of electrodes in this polarized electrode layer are prepared such that the end faces of the respective electrodes protrude in opposite directions. Separators are placed between each electrode of the pair of electrodes, and they are rolled together. Since the capacitor element thus constructed does not have an exposed section of the current collecting unit, which is entirely covered with polarized electrode layer, this structure can achieve downsizing of the capacitor and increasing of the capacity. Because the exposed section does not contribute to the capacitance value at all, while an exposed section is left at an end of the capacitor element demonstrated in the first embodiment.

In the first embodiment previously discussed, suppose that plural electrodes are manufactured all together in volume, the polarized electrode layer must be formed in the following way in order to leave the exposed sections of the current collecting unit on an end: The exposed section, i.e. the section not covered with the polarized electrode layer, must be formed in a striped pattern on a long length of a current collecting unit. This preparation needs alignment of both faces of the current collecting unit, so that work efficiency is lowered and yet dimensional accuracy is required. The polarized electrode layer formed on the entire face of the current collecting unit as demonstrated in this fourth embodiment can solve the foregoing problems, i.e. the work efficiency and dimensional accuracy.

Embodiment 5

The fifth embodiment presents a different structure in the capacitor element in accordance with the first embodiment. The other points remain unchanged from the capacitor element of the first embodiment, so that the detailed descriptions thereof are omitted and only the different points are described hereinafter.

A capacitor element used in this fifth embodiment has its polarized electrode layer formed on both the end faces removed. To be more specific, both the end faces of the capacitor element are heated over 180° C., and then the polarized electrode layers formed on both the end faces are removed mechanically. The binder formed of CMC (carboxymethyl cellulose), among other ingredients of the polarized electrode layer such as active carbon and binder, undergoes heat decomposition through this method, so that the retaining force of the active carbon weakens. As a result, the active carbon can be removed with ease. For instance, use of a brush or grindstone removes active carbon mechanically, so that the current collecting unit made of aluminum foil can be exposed. This method avoids inconveniences such as holes punched in joint sections of the terminal plate or the metal housing by the laser welding, so that the welding strength is enhanced and the reliability is improved. Meanwhile gasification of the binder increases the internal pressure, which results in punching holes. These are generally called "blow holes", which can be avoided by the present invention.

Here is another method of removing the polarized electrode layer formed on both the end faces of the capacitor element: at least one of the contacting sections of the terminal plate or the metal housing with the polarized electrode layer is mechanically removed with a rotary grindstone. This method produces an advantage similar to that of the previous method.

The capacitors discussed in embodiments 1-5 allow the anode and the cathode to be brought out from the capacitor element directly through the end face of the element without using a lead member, so that a lower resistance is expected. The anode and the cathode can be brought out through a terminal of the terminal plate and the metal housing respectively, so that a joint space between the respective capacitors can be reduced by half when plural capacitors are linked to each other to form a capacitor unit. As a result, the capacitor unit can be downsized advantageously with ease.

Embodiment 6

Figure 8:
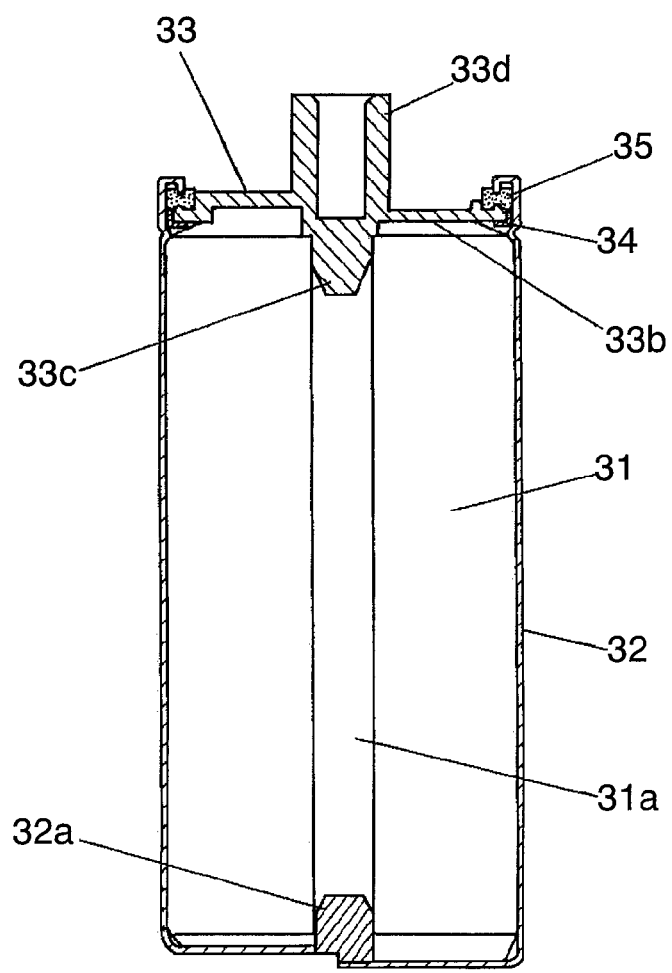
FIG. 8 shows a sectional view illustrating a structure of a capacitor in accordance with a sixth embodiment of the present invention.
Figure 9A:
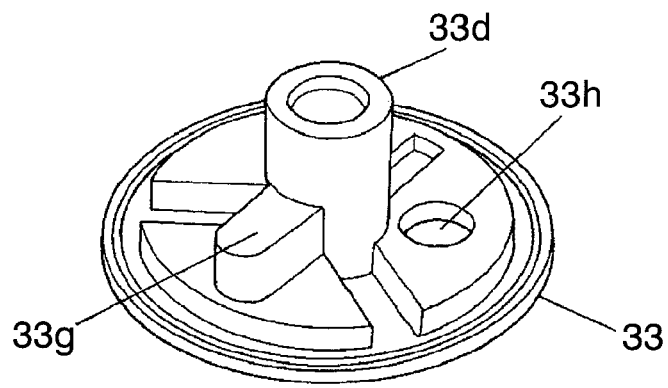
FIG. 9A shows a perspective view of a surface of a terminal plate to be used in the capacitor shown in FIG. 8.
Figure 9B:
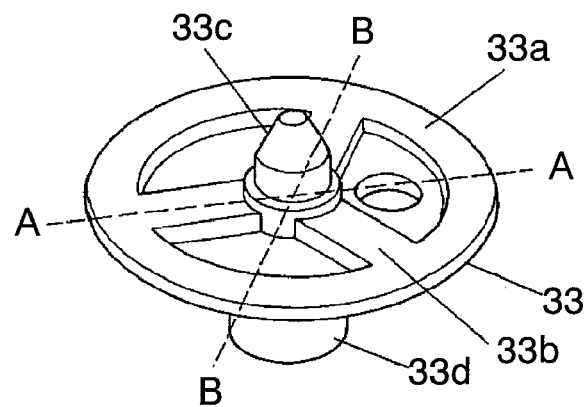
FIG. 9B shows a perspective view of an inner face of the terminal plate.
Figure 9C:
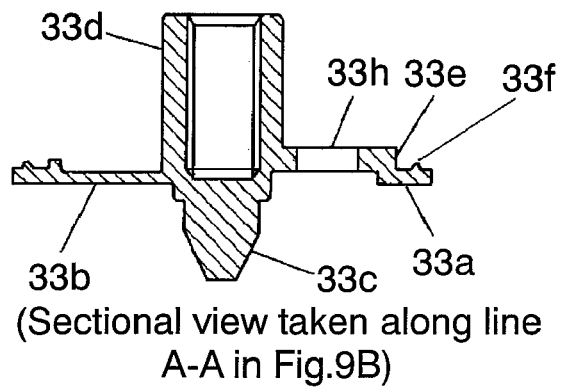
FIG. 9C shows a sectional view taken along line A-A in FIG. 9B.
Figure 9D:
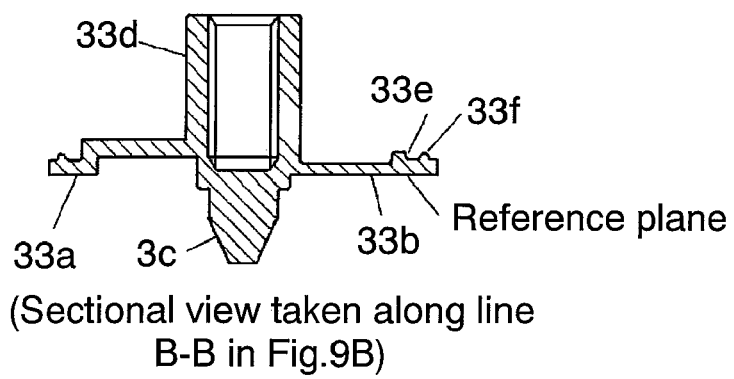
FIG. 9D shows a sectional view taken along line B-B in FIG. 9B.

FIG. 8 shows a sectional view illustrating a structure of a capacitor in accordance with the sixth embodiment of the present invention. FIGS. 9A, 9B, 9C and 9D show respectively a perspective view of a surface of a terminal plate to be used in the capacitor shown in FIG. 8, a perspective view of an inner face of the terminal plate, a sectional view taken along line A-A in FIG. 9B, and a sectional view taken along line B-B in FIG. 9B.

In FIG. 8, and FIGS. 9A-9D, capacitor element 31 includes hollow section 31a. A pair of electrodes, i.e. an anode and a cathode, are prepared in a polarized electrode layer formed on a current collecting unit, made of aluminum foil such that the anode and the cathode are shifted in opposite directions to each other, and a separator lies between the anode and the cathode, and then they are rolled together, thereby forming capacitor element 31 (not shown). The anode and the cathode are brought out respectively through top and bottom end faces of capacitor element 31, i.e. the electrodes are brought out along the vertical direction of FIG. 8 viewed from the front.

Capacitor element 31 and driving electrolyte are accommodated in closed end cylindrical metal housing 32 made of aluminum. Protrusion 32a is unitarily formed with the inner bottom face of housing 32 so that it fits into hollow section 31a. An end face of capacitor element 31 on the cathode side is coupled mechanically and electrically to the inner bottom face of housing 32 by laser welding.

Terminal plate 33 made of aluminum is coupled to an end face of capacitor element 31 on the anode side and also placed at the opening of metal housing 32 for sealing. Terminal plate 33 is coupled to the end face of capacitor element 31 at its inner face, which is referred to as a reference plane. This reference plane protrudes toward the surface side except outer rim 33a and plural belt-like coupling sections 33b extending from rim 33a toward the center. Rim 33a and coupling sections 33b remain as they are. Coupling sections 33b are coupled mechanically and electrically to the end face of capacitor element 31 on the anode side by laser welding.

Terminal plate 33 has protrusion 33c at the center of its inner face so that protrusion 33c can fit into hollow section 31a of capacitor element 31. Terminal plate 33 includes anode terminal 33d having an internal thread at its surface. Anode terminal 33d is used for connecting to an outer device. An outer rim on the surface side of terminal plate 33 has annular step 33e and annular protrusion 33f at about the center of annular step 33e. Step 33e and protrusion 33f firmly receive a sealing rubber to be described later. Rotation stopper 33g and safety-valve mounting hole 33h, which also functions as an inlet for the electrolyte, are placed on the surface of terminal plate 33. A recess, into which the safety valve (not shown) to be fitted to hole 33h lies in a non-contact manner, is provided on the end face of capacitor element 31 on the anode side. The foregoing structure can avoid an unexpected electrical short, and also serves to downsize capacitor element 31.

In FIG. 8, protrusion 33c provided to the inner face of terminal plate 33 is fitted into hollow section 31a of capacitor element 31, and coupling section 33b is laser-welded to the end face of element 31 on the anode side, so that a mechanical and electrical joint is completed. Terminal plate 33 is placed at the opening of metal housing 31 with insulating member 34 intervening there, and sealing rubber 35 is placed on the rim of plate 33. Edge of the opening is curled so that sealing rubber 35 can be urged against housing 32, thereby sealing metal housing 32.

The capacitor thus constructed in accordance with the sixth embodiment allows the reference plane of its terminal plate 33 to be coupled to the end face of capacitor element 31 on the anode side. Thus the height between the end face and the upper end of metal housing 32 having undergone the process can be extremely lowered. Thus capacitors of the same height can accommodate a higher capacitor element and obtain advantages such as a greater capacity and a lower resistance simultaneously.

Figure 10:
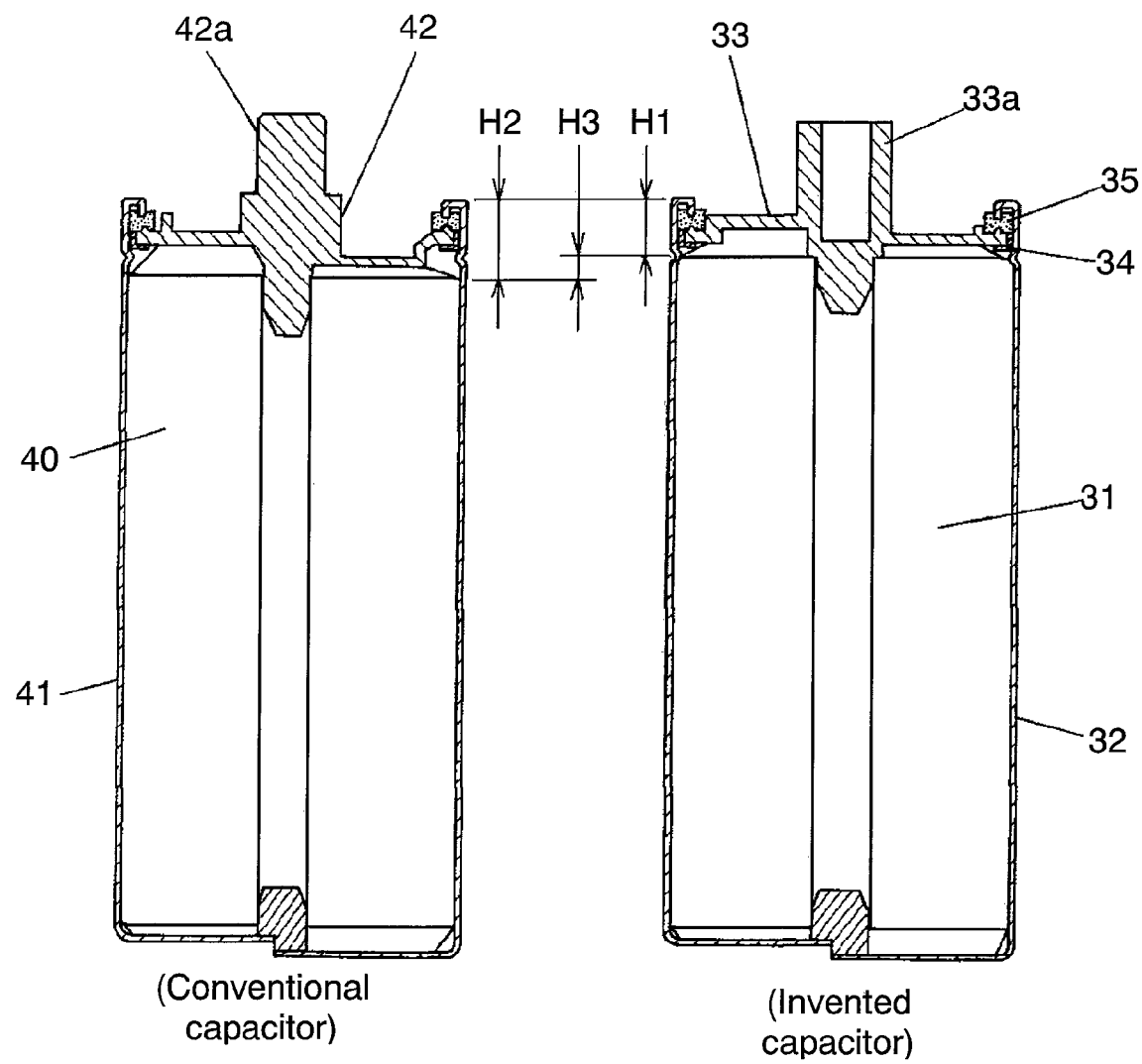
FIG. 10 shows sectional views of the capacitor shown in FIG. 9A and a conventional capacitor for comparison.

FIG. 10 clearly shows the advantages obtained by the sixth embodiment of the present invention. FIG. 10 compares the capacitor of the present invention with a conventional one. The invented capacitor (on the right side of FIG. 10 viewed from the front) has a smaller height H1 between the end face of capacitor element 31 and the upper end of metal housing 32 due to the advantage of terminal plate 33. On the other hand, the conventional capacitor (on the left side of FIG. 10 viewed from the front) has a greater height H2, and the height difference is H2-H1=H3 as shown in FIG. 10.

Suppose that capacitors of the same height are prepared, capacitor element 31 can be higher by H3=height difference, so that this capacitor can increase the capacity and also lowers the resistance simultaneously. Table 1 below shows such improvements in characteristics, and Table 1 also shows characteristics of the capacitor in accordance with the seventh embodiment.

TABLE 1

|  | Embodiment 6 | | Embodiment 7 | |
| --- | --- | --- | --- | --- |
|  | invented | conventi | invented | conventi |
| capacity (%) | 125 | 114 | 110 | 100 |
| DCR (%) | 80 | 88 | 91 | 100 |

As table 1 shows, the capacitor in accordance with the sixth embodiment has a 25% increase in capacitance and yet a 20% decrease in DCR (DC Resistance) compared with those of a conventional capacitor related to the capacitor in accordance with the seventh embodiment demonstrated later. The sixth embodiment thus provides great improvements.

In the sixth embodiment, rotation stopper 33g disposed on the surface of terminal plate 33 is used for stopping terminal plate 33 from rotating when an external thread (not shown) is screwed into the internal thread disposed on anode terminal 33d to be used for outer connection. In this embodiment, protruding stopper 33g is used; however, the present invention is not limited to this example, and a denting stopper can be used.

In this sixth embodiment, anode terminal 33d for outer connection disposed on the surface of terminal plate 33 is shaped like a protrusion having the internal thread; however, the present invention is not limited to this example, and any shape can be considered in a designing stage.

Capacitor element 31 in accordance with the sixth embodiment is formed in this way: A pair of electrodes, i.e. an anode and a cathode, is prepared in a polarized electrode layer formed on a current collecting unit, made of aluminum foil, such that the anode and the cathode are shifted in opposite directions to each other, and a separator lies between the anode and the cathode, and then they are rolled together, thereby forming capacitor element 31. However, the present invention is not limited to this example. The polarized electrode layer, which forms the electrodes, can be formed on the current collecting unit leaving the unit exposed on its one end, and a pair of an anode and a cathode is placed such that the exposed sections are oriented in opposite directions to each other, and then the separator is provided therebetween before they are rolled together.

Here is another structure of the capacitor element: The polarized electrode layer forming the electrodes is formed over all of the current collecting unit without exposing any of the current collecting unit, and a pair of an anode and a cathode is placed such that the anode and the cathode are shifted in opposite directions from each other and the respective ends of the anode and the cathode protrude in opposite directions, and then a separator is disposed in between the anode and cathode before they are rolled together.

In this sixth embodiment, the anode of capacitor element 31 is brought out through terminal plate 33, and the cathode thereof is brought out through metal housing 32. However, the present invention is not limited to this example, and those can be brought out oppositely to what is discussed above.

Embodiment 7

The seventh embodiment demonstrates a capacitor having a terminal plate and a metal housing that are changed in construction from those used in the sixth embodiment, and also a structure of bringing out the anode and the cathode is changed from the comparable method employed in the sixth embodiment. The other structures remain unchanged from those of the sixth embodiment. Thus elements similar to those used in the sixth embodiment have the same reference characters and detailed descriptions thereof are omitted here, and only different points are described hereinafter with reference to FIGS. 11-13.

Figure 11:
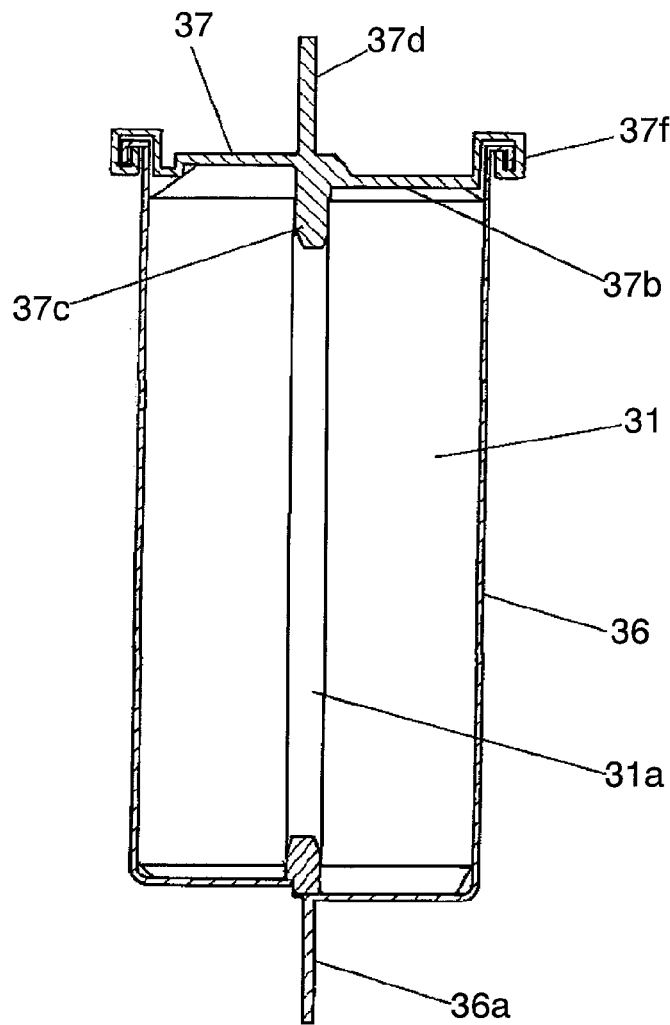
FIG. 11 shows a sectional view illustrating a capacitor in accordance with a seventh embodiment of the present invention.
Figure 12:
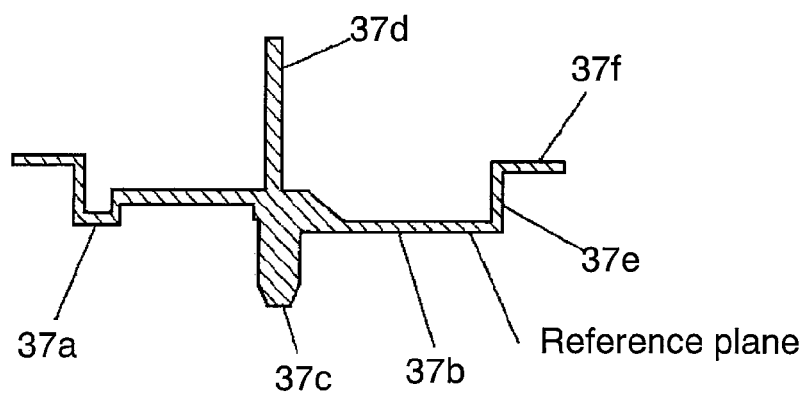
FIG. 12 shows a sectional view illustrating a structure of a terminal plate to be used in the capacitor shown in FIG. 11.

FIG. 11 shows a sectional view illustrating a capacitor in accordance with the seventh embodiment of the present invention. FIG. 12 shows a sectional view illustrating a structure of a terminal plate to be used in the capacitor. In FIGS. 11 and 12, capacitor element 31 and driving electrolyte (not shown) are accommodated in cylindrical metal housing 36 made of aluminum and having a closed end. Housing 36 includes belt-like cathode terminal 36a at the outer bottom face for outer connection. Cathode terminal 36a is unitarily formed with the outer bottom face of housing 36. Terminal plate 37 made of aluminum is placed such that it is coupled to an end face of capacitor element 31 on the anode side and situated at an opening of metal housing 36 for sealing. Terminal plate 37 is coupled to the foregoing end face at its inside face, which is referred to as a reference plane. This reference plane is protruded toward the surface side except outer rim 37a and plural belt-like coupling sections 37b extending from rim 37a toward the center. Coupling sections 37b are coupled mechanically and electrically to the end face of capacitor element 31 on the anode side by laser welding. Terminal plate 37 has protrusion 37c at the center of its inner face so that protrusion 37c can fit into hollow section 31a of capacitor element 31. Those structures are the same as those in the sixth embodiment.

Terminal plate 37 has belt-like anode terminal 37d on its surface for outer connection, and it has annular rising section 37e on its rim and winding processing section 37f extending like a brim along the outer diameter from the upper end of rising section 37e. Rising section 37e and processing section 37f are unitarily formed. Protrusion 37c provided to the inner face of terminal plate 37 is fitted into hollow section 31a of capacitor element 31, and coupling section 37b is laser-welded to the end face of element 31 on the anode side, so that a mechanical and electrical joint is completed. Terminal plate 37 is placed at an opening of metal housing 36, and the rim of winding processing section 37f and the opening of housing 36 are wound tightly together with an insulating member (not shown) therebetween, so that dual winding is carried out for sealing.

The capacitor thus constructed and in accordance with the seventh embodiment can shorten the height from the end face of capacitor element 31 on the anode side to the upper end of metal housing 36 having undergone the process. This is the same advantage as that of the sixth embodiment. Thus capacitors of the same height can accommodate a higher capacitor element and obtain advantages such as a greater capacity and a lower resistance simultaneously.

Figure 13:
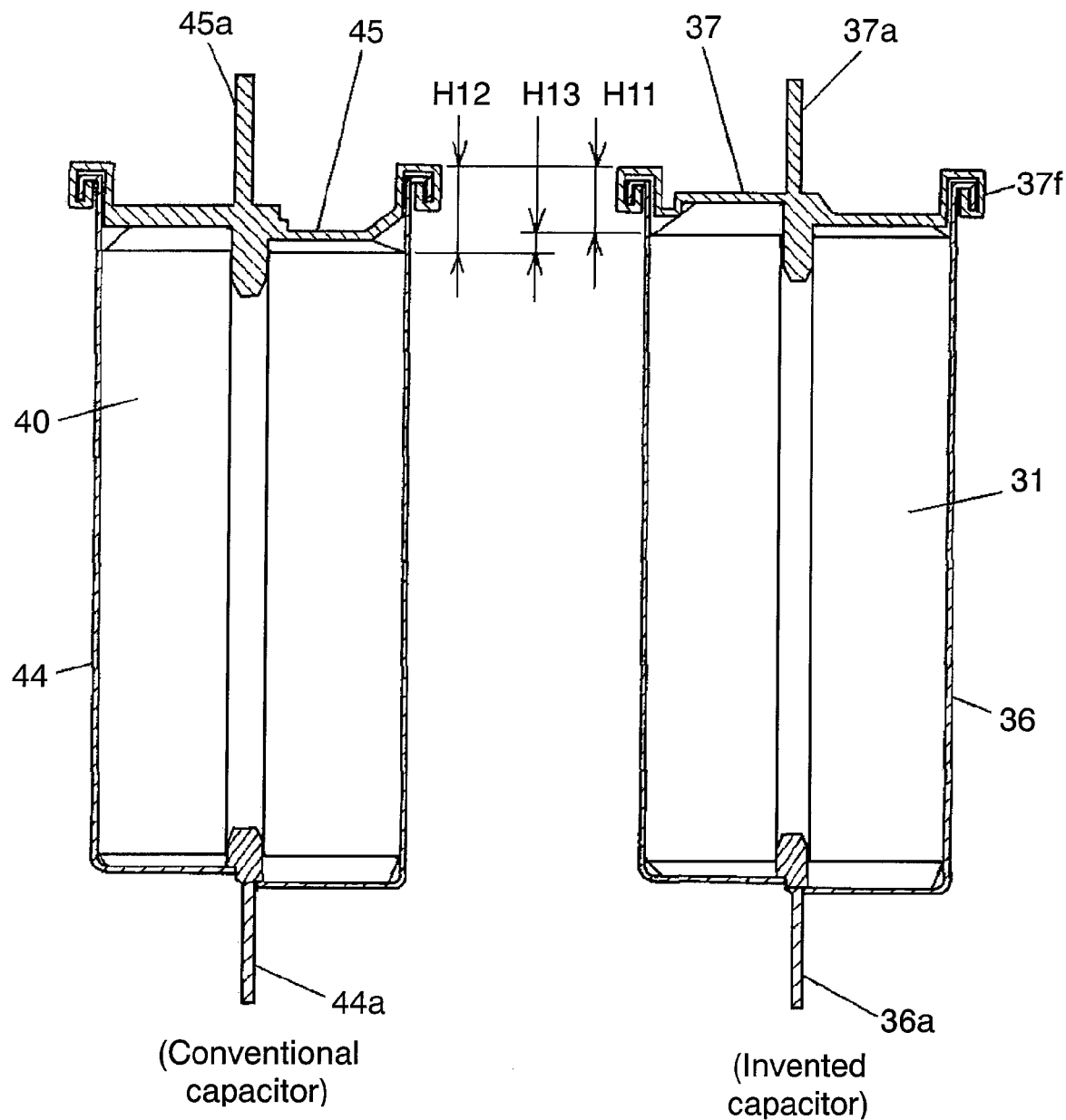
FIG. 13 shows sectional views of the capacitor shown in FIG. 11 and a conventional capacitor for comparison.
Figure 27:
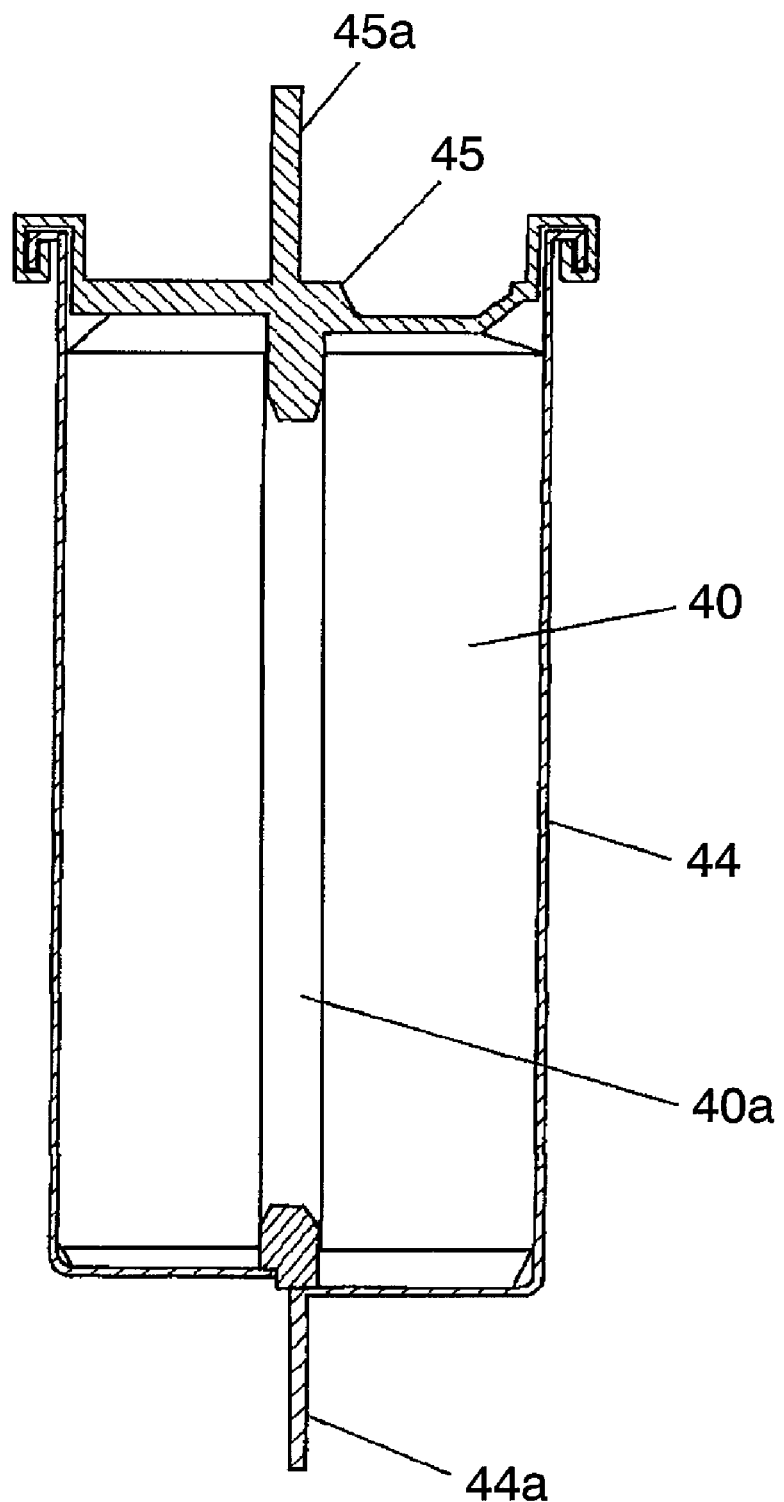
FIG. 27 shows a sectional view illustrating still another structure of the conventional capacitor.

FIG. 13 compares the capacitor in accordance with the seventh embodiment with the conventional capacitor (refer to FIG. 27) in order to clearly describe the advantages of the seventh embodiment. In FIG. 13, the invented one (right side of FIG. 13 viewed from the front) has height H11 between the end face of capacitor element 31 and the upper end of metal housing 36 due to the advantage of terminal plate 37. On the other hand, the conventional capacitor (on the left side of FIG. 13 viewed from the front) has height H12, and the height difference is H12−H11=H13 as shown in FIG. 13.

Suppose that capacitors of the same height are prepared, capacitor element 31 can be higher by H13=the height difference, so that this capacitor can increase the capacity and also lower the resistance simultaneously. Those advantages are listed in table 1 together with those of the capacitor in accordance with the sixth embodiment.

As table 1 shows, the capacitor in accordance with the seventh embodiment increases capacitance by 10% and reduces resistance by 9% from those (100%) of the conventional one, so that great advantages are obtainable.

Embodiment 8

The eighth embodiment changes the structure in part of the anode terminal provided to the terminal plate of the capacitor in accordance with the sixth embodiment previously discussed. The other structures remain unchanged from those of the sixth embodiment, so that similar elements to those of the sixth embodiment have the same reference characters and the detailed descriptions thereof are omitted here. Only different points are detailed hereinafter with reference to FIGS. 14A and B.

Figure 14A:
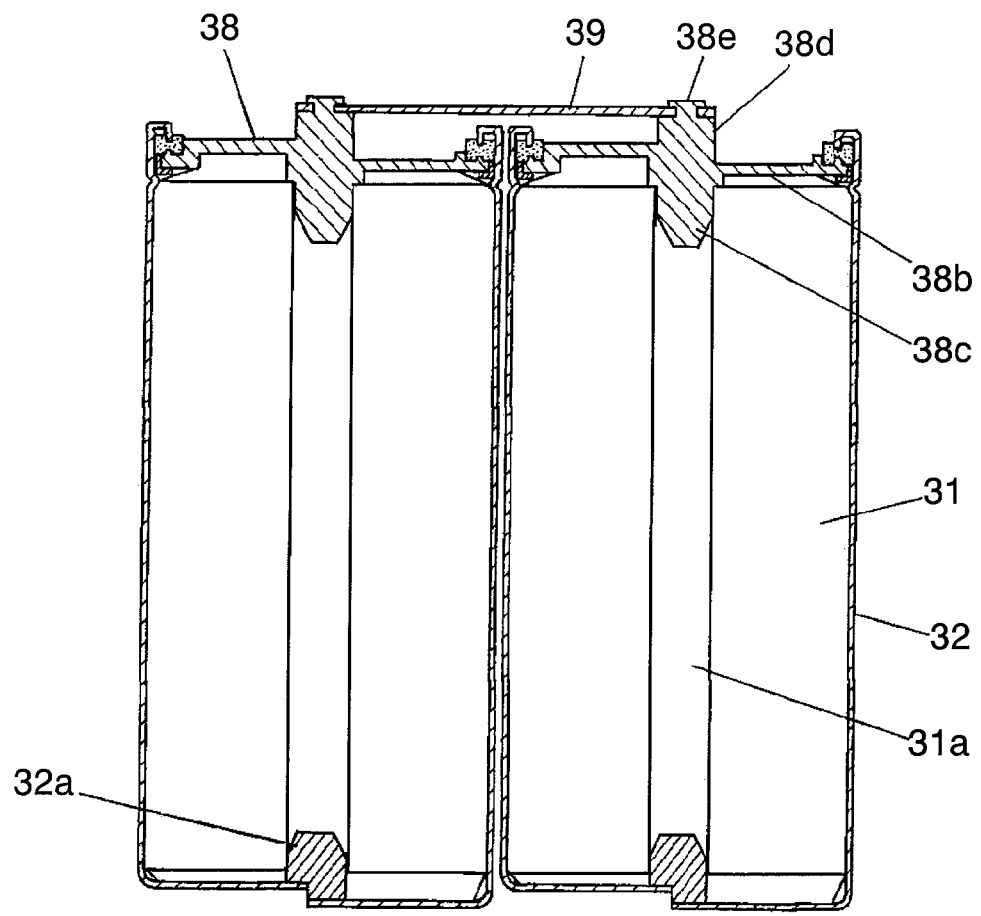
FIG. 14A shows a sectional view illustrating a plurality of capacitors linked to each other in accordance with an eighth embodiment of the present invention.
Figure 14B:
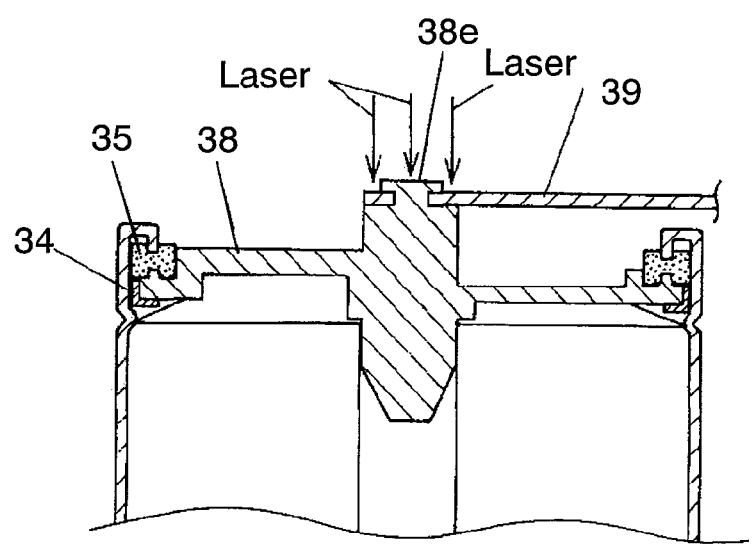
FIG. 14B shows a sectional view of an enlarged essential part of FIG. 14A.

FIG. 14A shows a sectional view illustrating a plurality of capacitors linked to each other in accordance with the eighth embodiment of the present invention. FIG. 14B shows a sectional view illustrating an enlarged essential view of FIG. 14A. FIG. 14A shows terminal plate 38, coupling section 38b, protrusion 38c, anode terminal 38d for outer connection, caulking section 38e formed by tapering a tip of anode terminal 38d, and coupling bar 39.

The capacitor thus constructed is used in the eighth embodiment where a plurality of the capacitors are linked to each other. As shown on an enlarged scale FIG. 14B, coupling bar 39 is fitted to caulking section 38e provided to anode terminal 38d of terminal plate 38, so that caulking section 38e is fixed to bar 39. The plurality of capacitors are thus coupled to each other. The vicinity of caulking section 38e is laser-welded for a more reliable joint. The foregoing construction can lower the height of the capacitor more than the structure of anode terminal 33d having an internal thread described in the sixth embodiment.

The capacitors demonstrated in embodiments 6-8 can extremely shorten the height from the end face of the capacitor element on the anode side to the upper end of the metal housing after the process. Suppose that capacitors of the same height are prepared, the capacitor in accordance with those embodiments can accommodate a capacitor element having a greater height, so that this capacitor can advantageously increase the capacity and also lower the resistance simultaneously. The capacitors in accordance with those embodiments are thus useful for the applications which need downsized capacitors with increased capacitance values.

Embodiment 9

Figure 15:
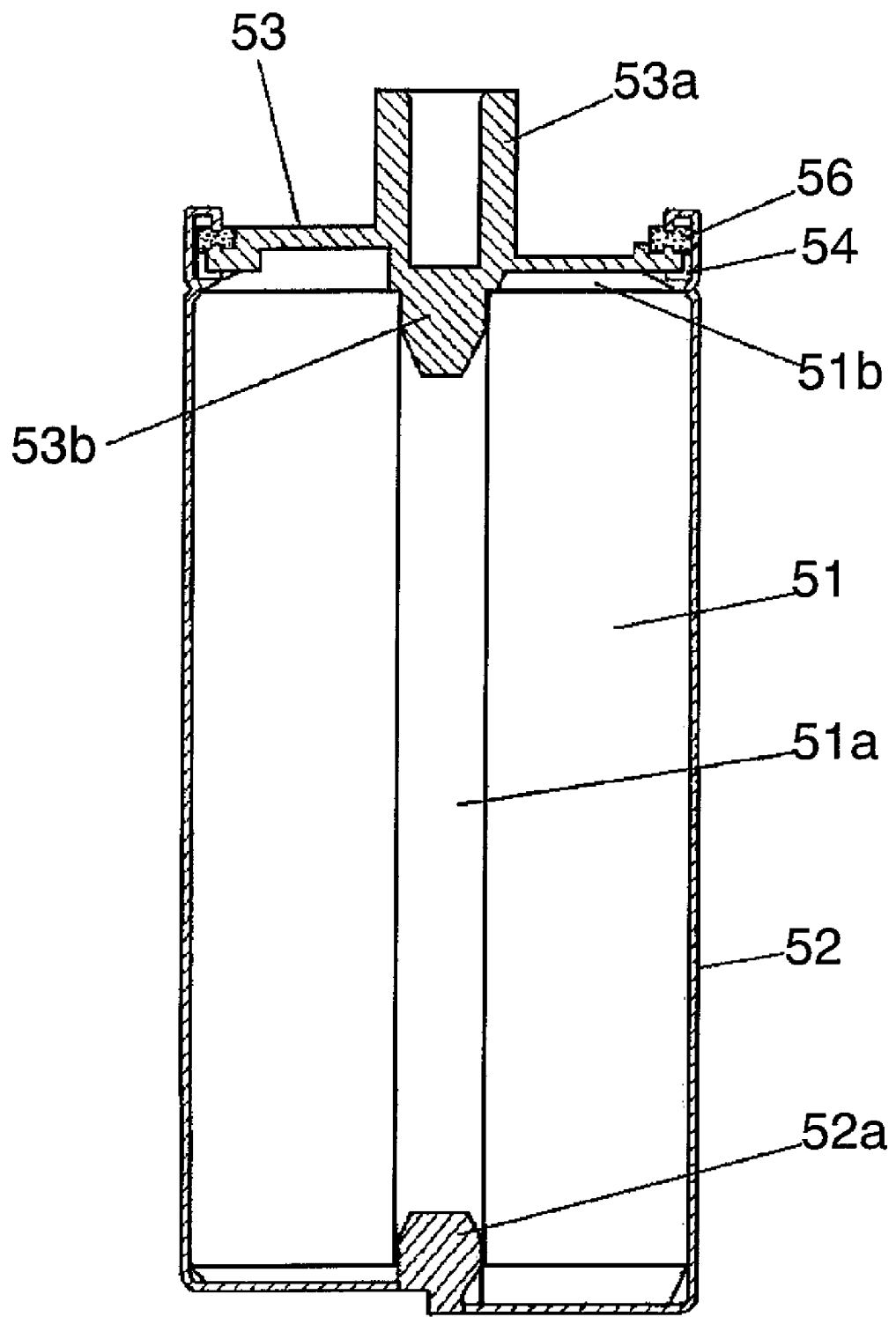
FIG. 15 shows a sectional view illustrating a capacitor in accordance with a ninth embodiment of the present invention.
Figure 16:
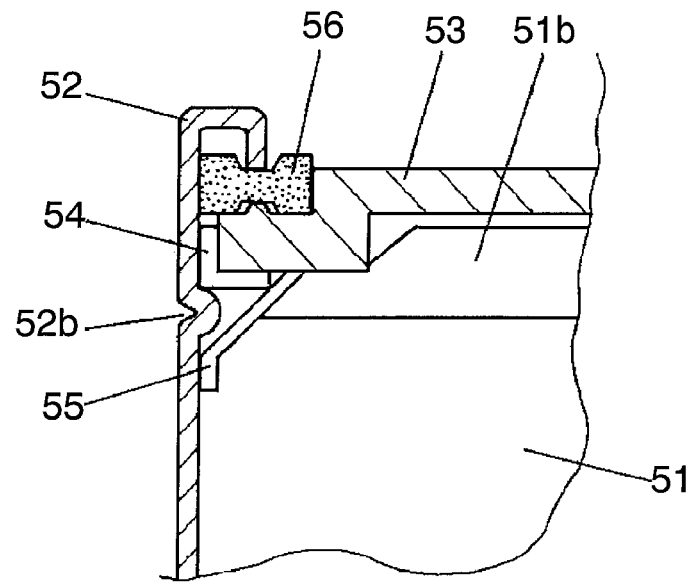
FIG. 16 shows a sectional view of an essential part of FIG. 15.

FIG. 15 shows a sectional view illustrating a capacitor in accordance with the ninth embodiment of the present invention. FIG. 16 shows a sectional view of an essential part of FIG. 15. In FIGS. 15 and 16, capacitor element 51 includes hollow section 51a and end face 51b. A pair of electrodes, i.e. an anode and a cathode, are prepared in a polarized electrode layer formed on a current collecting unit made of aluminum foil such that the anode and the cathode are shifted in opposite directions from each other, and a separator (not shown) lies between the anode and the cathode, and then they are rolled together, thereby forming capacitor element 51. The anode and the cathode are brought out respectively from both the ends of capacitor element 51, i.e. from the top and the bottom of element 51 viewing FIG. 15 from the front.

Capacitor element 51 and driving electrolyte (not shown) are housed in cylindrical metal housing 52 made of aluminum and having a closed end. Protrusion 52a is unitarily formed with the inner bottom face of housing 52 so that it fits into hollow section 51a of element 51. An end face of capacitor element 51 on the cathode side is coupled mechanically and electrically to the inner bottom face of housing 52 by laser welding. Metal housing 52 is provided with a section 52b having a V-shaped sectional view by a drawing process, which holds down a rim of the upper end face of capacitor element 51 from the outside.

Terminal plate 53 made of aluminum has anode terminal 53a for outer connection. Protrusion 53b is fitted into hollow section 51a of element 51. The end face of element 51 on the anode side is coupled electrically and mechanically to an inner face of terminal plate 53 by laser welding.

On the upper end of ring-shaped and drawing processed section 52b, first insulating ring 54 is placed so as to lie between an inner wall of metal housing 52 and an outer wall of terminal plate 53 and leads to in part an inner face of terminal plate 53. This structure insulates terminal plate 53 from metal housing 52.

Insulating sheet 55 lies on the rim of the end face of capacitor element 51 and leads to an inner part of an outer wall thereof. This structure prevents the rim of the end face of capacitor element 51 on the anode side from touching the inner wall of metal housing 52, so that a short between them can be avoided.

Sealing ring 56 made of insulating rubber is placed on the surface rim of terminal plate 53, and the opening of metal housing 52 is curled together with ring 56 (generally called "curling process"), thereby sealing metal housing 52.

As discussed above, the capacitor in accordance with the ninth embodiment employs insulating sheet 55 lying on the rim of the end face of capacitor element 51 and leading to an inner part of an outer wall of element 51. In other words, insulating sheet 55 is placed between the inner wall of metal housing 52 and over the rim of the end face of capacitor element 51 on the anode side, so that an unexpected electrical short can be avoided. As a result, a reliable capacitor excellent in electrical characteristics is obtainable.

First insulating ring 54 can be formed of rubber or resin (PP, PPS). When the resin is used, a bending modulus thereof is preferably not less than 500 Mpa in order to keep the resilience of ring 56 normal.

In this ninth embodiment, insulating sheet 55 lies on the rim of the end face of capacitor element 51 and leads to an inner part of an outer wall thereof. However, the present invention is not limited to this example. Metal housing 52 is insulated at least at part of its inner wall which closely faces capacitor element 51 at the rim of the end face continuing to an outer wall thereof. This structure can obtain an advantage similar to what is discussed previously.

Capacitor element 51 in accordance with the ninth embodiment is formed in this way: A pair of electrodes, i.e. an anode and a cathode, is prepared in a polarized electrode layer formed on a current collecting unit made of aluminum foil such that the anode and the cathode are shifted in opposite directions from each other, and a separator lies between the anode and the cathode, and then they are rolled together, thereby forming capacitor element 51. Here is another example of the capacitor electrode thus constructed: The polarized electrode layer, which forms the electrodes, can be formed on the current collecting unit leaving the unit exposed on its one end, and a pair of an anode and a cathode are placed such that the exposed sections are oriented in opposite directions to each other, and then the separator is disposed therebetween before they are rolled together. Here is still another structure of the capacitor element: The polarized electrode layer forming the electrodes is formed over all of the current collecting unit without exposing any of the current collecting unit, and a pair of an anode and a cathode are placed such that the anode and the cathode are shifted in opposite directions from each other and the respective ends of the anode and the cathode protrude in opposite directions, and then a separator is disposed between the anode and the cathode before they are rolled together.

Embodiment 10

The tenth embodiment presents a capacitor having an insulation structure between an end face of a capacitor element on the anode side and an inner face of a metal housing, and this structure is different from that of the capacitor demonstrated in the ninth embodiment. Other structures remain unchanged from those of the ninth embodiment, so that similar elements have the same reference characters as those of the ninth embodiment and the detailed descriptions thereof are omitted. Only different points are described hereinafter with reference to FIG. 17.

Figure 17:
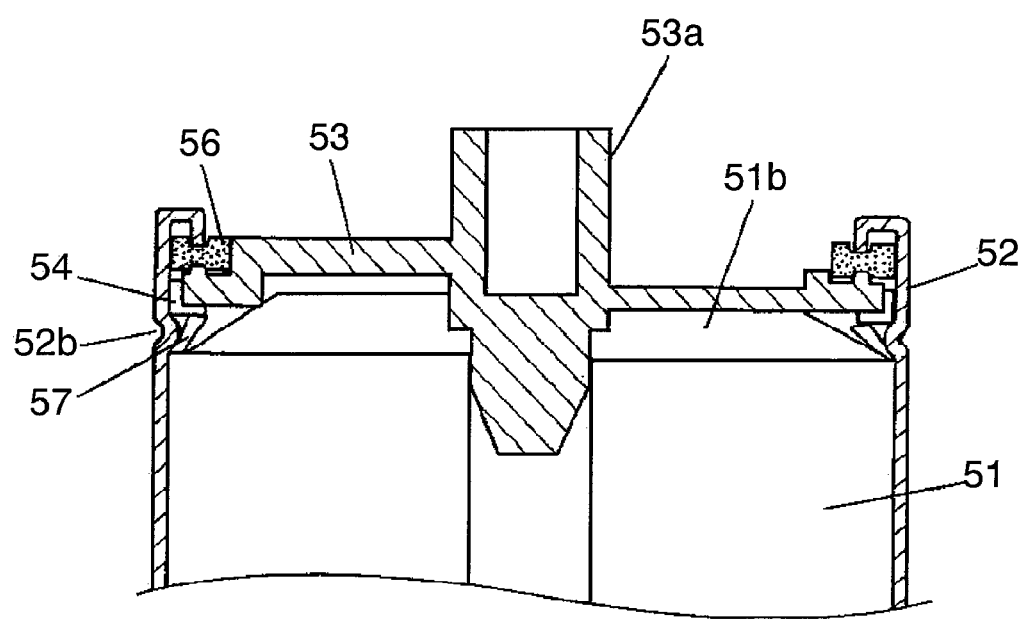
FIG. 17 shows a sectional view illustrating a structure of an essential part of a capacitor in accordance with a tenth embodiment of the present invention.

FIG. 17 shows a sectional view illustrating a structure of an essential part of the capacitor in accordance with the tenth embodiment of the present invention. In FIG. 17, second insulating ring 57 lies between a bottom face of first insulating ring 54 and the rim of the end face of capacitor element 51 on the anode side, and yet, its outer rim closely faces drawing-processed section 52b of metal housing 52.

The capacitor thus constructed has second insulating ring 57 intervening between the rim of the end face of capacitor element 51 on the anode side and the inner face of metal housing 52, so that an unexpected electrical short can be avoided. Although the ninth embodiment previously discussed includes insulating sheet 55 or insulation on metal housing 52, this tenth embodiment does need those things, yet, the tenth embodiment can provide reliable capacitors.

Embodiment 11

The 11th embodiment presents a capacitor having an insulation structure between an end face of a capacitor element on the anode side and an inner face of a metal housing, and this insulation structure is different from that of the capacitor demonstrated in the ninth embodiment. Other structures remain unchanged from those of the ninth embodiment, so that similar elements have the same reference marks as those of the ninth embodiment and the detailed descriptions thereof are omitted. Only different points are described hereinafter with reference to FIG. 18.

Figure 18:
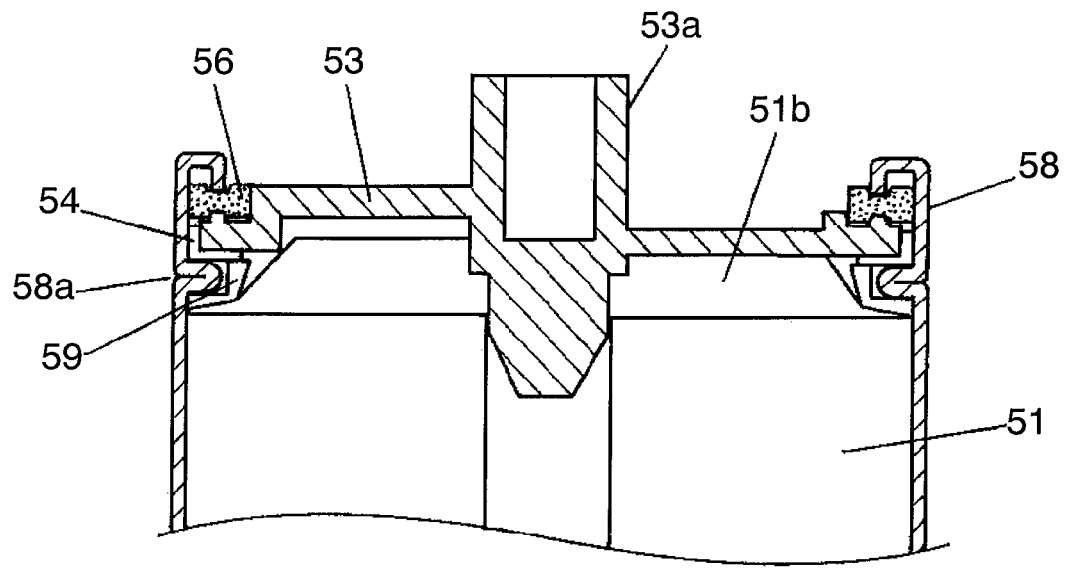
FIG. 18 shows a sectional view illustrating a structure of an essential part of a capacitor in accordance with an eleventh embodiment of the present invention.

FIG. 18 shows a sectional view illustrating a structure of an essential part of a capacitor in accordance with the 11th embodiment of the present invention. In FIG. 18, metal housing 58 includes annular drawing-processed section 58a. The drawing process results in a U-shaped or V-shaped sectional view of section 58a. Second insulating ring 59 is formed protruding, so that its upper face contacts the bottom face of first insulating ring 54 and its lower end contacts the rim of the end face of capacitor element 51 on the anode side. At least one of the bottom face or the lateral face of the U-shaped drawing-processed section 58a contacts or closely faces second insulating ring 59.

The capacitor thus constructed has second insulating ring 59 intervening between the rim of the end face of capacitor element 51 on the anode side and the inner face of metal housing 52, so that an unexpected electrical short can be avoided. As a result, a capacitor more reliable in insulation than the capacitor in accordance with the ninth embodiment is obtainable.

Embodiment 12

The 12th embodiment presents a capacitor having an insulation structure between an end face of a capacitor element on the anode side and an inner face of a metal housing, and this insulation structure is different from that of the capacitor demonstrated in the ninth embodiment. Other structures remain unchanged from those of the ninth embodiment, so that similar elements have the same reference characters as those of the ninth embodiment and the detailed descriptions thereof are omitted. Only different points are described hereinafter with reference to FIG. 19.

Figure 19:
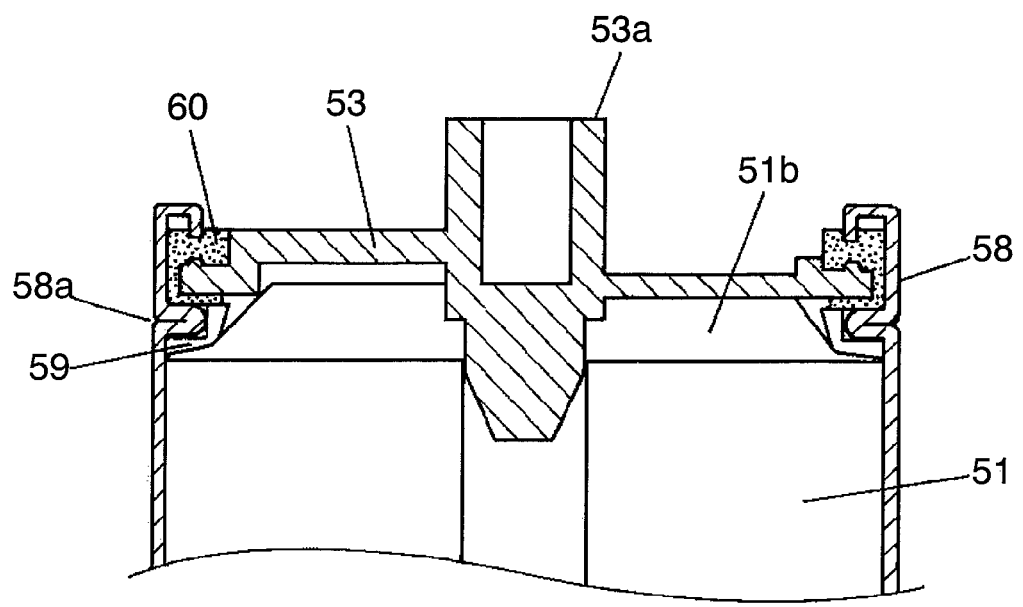
FIG. 19 shows a sectional view illustrating a structure of an essential part of a capacitor in accordance with a twelfth embodiment of the present invention.

FIG. 19 shows a sectional view illustrating a structure of an essential part of the capacitor in accordance with the 12th embodiment of the present invention. In FIG. 19, sealing ring 60 made of rubber is formed such that its sectional view shows a U-shape or V-shape so that ring 60 can contact the outer wall, the rims in part on the surface and the underside of terminal plate 53. Sealing ring 60 is placed on the upper end of drawing-processed section 58a of metal housing 52.

The capacitor thus constructed in accordance with the 12th embodiment needs no first insulating ring 54 described in embodiments 9-11, so that sealing ring 60 and second insulating ring 59 alone can achieve highly reliable insulation.

As discussed above, the capacitors in accordance with embodiment 9-12 allow the anode and the cathode to be brought out directly from the end faces of the capacitor element without using any lead member, so that a lower resistance is expected. The anode and the cathode can be brought out to the outside from the terminal provided to the terminal plate and from the metal housing, so that a coupling space between the respective capacitors can be reduced by half when plural capacitors are linked to each other for forming a capacitor unit. The foregoing structures and the advantages allow the capacitors in accordance with embodiments 9-12 to be used advantageously for regenerating batteries of hybrid cars and fuel-cell powered vehicles, or for power storage.

Embodiment 13

Figure 20A:
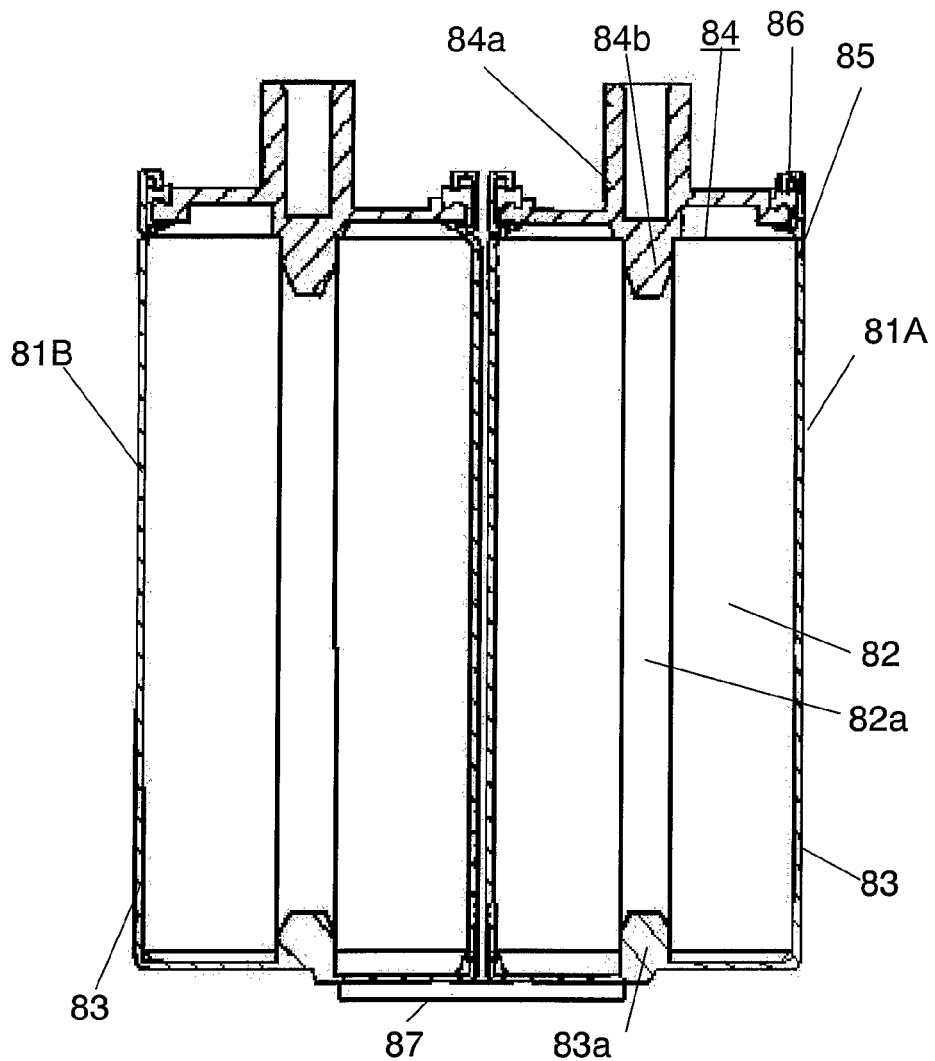
FIG. 20A shows a front sectional view illustrating a structure of a capacitor in accordance with a thirteenth embodiment of the present invention.
Figure 20B:
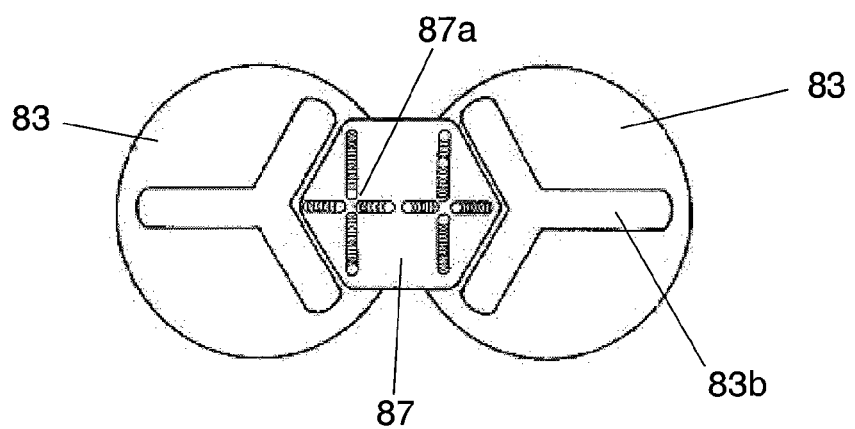
FIG. 20B shows a bottom view of the capacitor in accordance with the thirteenth embodiment.

FIGS. 20A and 20B show respectively a front sectional view and a bottom view illustrating a structure of a capacitor in accordance with the 13th embodiment of the present invention. In these drawings, capacitor 81A and capacitor 81B are oriented with different polarities from each other.

First, capacitor 81A is demonstrated hereinafter. Its capacitor element 82 includes hollow section 82a. A pair of electrodes, i.e. an anode and a cathode, are prepared in a polarized electrode layer formed on a current collecting unit made of aluminum foil, such that the anode and the cathode are shifted in opposite directions from each other, and a separator (not shown) lies between the anode and the cathode, and then they are rolled together, thereby forming capacitor element 82. The anode and the cathode are brought out respectively from both the end faces of element 82 (top and bottom in FIG. 20).

Capacitor element 82 and driving electrolyte (not shown) are housed in cylindrical metal housing 83 made of aluminum and having a closed end. Protrusion 83a is unitarily formed with the inner bottom face of housing 83 so that it fits into hollow section 82a of element 82. An end face of capacitor element 82 on the cathode side is coupled mechanically and electrically to an inner bottom face of housing 83 by laser welding.

Terminal plate 84 made of aluminum is coupled to an end face of element 82 on the anode side and also placed at the opening of housing 83 for sealing. On the surface of terminal plate 84 (upper side in FIG. 20A), terminal 84a for outer connection is unitarily formed with the surface, and on the underside thereof (lower side in FIG. 20A), protrusion 84b to be fitted into hollow section 82a is unitarily formed with the underside. Terminal plate 84 is placed at the opening of metal housing 83 with insulating member 85 intervening, and sealing rubber 86 is placed on the surface rim of terminal plate 84. Then an opening end of housing 83 is curled such that it urges rubber 86 against housing 83, thereby sealing metal housing 83.

Capacitor 81A thus constructed allows the anode to be brought out through terminal 84a provided to terminal plate 84, and the cathode to be brought out through metal housing 83.

On the other hand, capacitor 81B is placed with reverse polarity relative to capacitor 81A, namely, the anode of capacitor element 82 is brought out through metal housing 83 and the cathode is brought out through terminal 84a.

Coupling plate 87 made of aluminum straddles an outer bottom face of metal housing 83 of capacitor 81A and that of capacitor 81B, and coupling plate 87 thus situated is laser-welded to capacitors 81A and 81B for coupling those two capacitors mechanically and electrically in series.

Coupling plate 87 is shaped like a hexagon, and a contacting area between plate 87 and housings 83 is less than 50% of the outer bottom area of housing 83. This structure assures sufficient strength for the joint, and if an inside pressure of metal housing 83 increases due to some changes in environment or condition, which bulges the bottom of metal housing 83, this structure can prevent an adverse affect due to this bulging phenomenon. The hexagonal coupling plate 87 allows for taking out material thereof in hound's-tooth check pattern, so that the material can be efficiently used.

FIG. 20B shows a number of traces 87a due to laser-welding of coupling plate 87 with metal housing 83. The laser-welding is carried out such that these numerous traces 87a are arranged generally in straight lines. This structure obtains the following advantage: Metal housing 83 is bulged by the heat due to the laser-welding and then contracts following the temperature which lowers to a normal temperature in due course. The contraction produces some distortion; however, the foregoing structure can minimize the distortion. Recesses 83b shaped like a wild-chervil shown in FIG. 20B are ribs for coupling an end face of capacitor element 82 to the inner bottom face of metal housing 83 by laser-welding.

A thickness of coupling plate 87 preferably ranges from 0.1-0.8 mm, or more preferably, from 0.2-0.5 mm because this thickness is thin enough for assuring a permissible current value of capacitors 81A, 81B with tolerance and also assuring strength of the coupling plate as well as strength of the welded sections.

The capacitor thus constructed allows the anode and the cathode to be brought out directly from the end faces of the capacitor element without using any lead member, so that a lower resistance is expected. The anode and the cathode can be brought out to the outside from terminal 84a provided to terminal plate 84 and from metal housing 83, so that a coupling space between the respective capacitors can be reduced by half when plural capacitors are linked to each other for forming a capacitor unit. The capacitor unit can be thus downsized.

Embodiment 14

The 14th embodiment presents a capacitor having a coupling plate different from that of the capacitor in accordance with the 13th embodiment. Other structures remain unchanged from those of the 13th embodiment, so that similar elements have the same reference characters and the detailed descriptions thereof are omitted. Only different points are demonstrated hereinafter with reference to FIG. 21.

Figure 21:
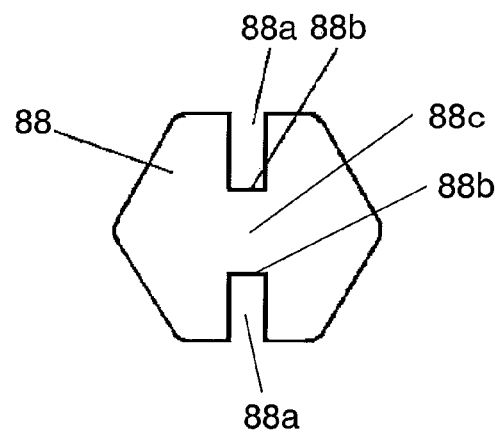
FIG. 21 shows a plan view illustrating a structure of a coupling plate to be used in a capacitor in accordance with a fourteenth embodiment of the present invention.

FIG. 21 shows a plan view illustrating a structure of a coupling plate to be used in a capacitor in accordance with the 14th embodiment of the present invention. In FIG. 21, hexagonal coupling plate 88 is cut out around center section 88c which corresponds to a border between the two capacitors, so that notches 88a are formed. Notches 88a have a linear section 88b at their edges near center section 88c of plate 88.

Use of coupling plate 88 thus constructed can obtain the following advantage in addition to the advantage obtained by embodiment 13. If subtle dispersion in parallelism or height occurs between the outer bottom faces of capacitors 81A and 81B, notches 88a can absorb the dispersion, so that a more accurate joint is obtainable.

Linear sections 88b at the edge of notches 88a near center section 88c are useful for absorbing the dispersion with notches 88a, because they can moderate stress concentration, so that more reliable capacitors are obtainable.

Embodiment 15

The 15th embodiment presents a capacitor that is sheathed, although the capacitor per se is demonstrated in embodiment 13. Other structures remain unchanged from those of embodiment 13, so that similar elements have the same reference characters and the detailed descriptions thereof are omitted. Only different points are demonstrated hereinafter with reference to FIG. 22.

Figure 22:
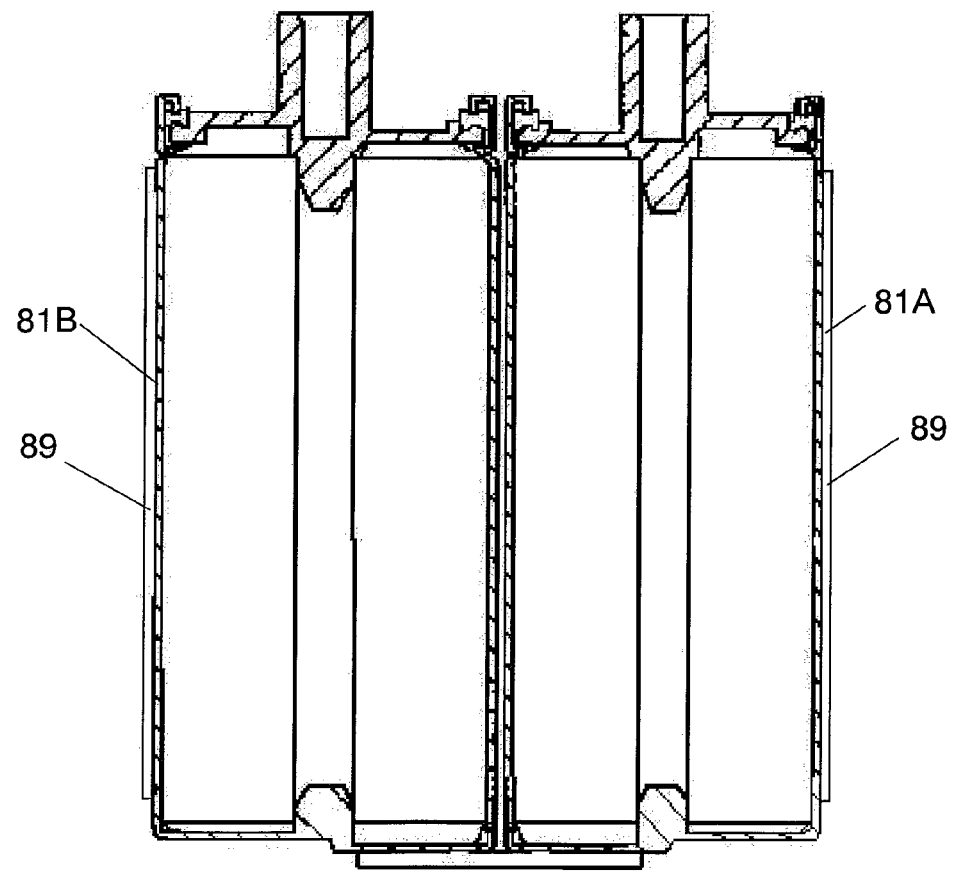
FIG. 22 shows a front sectional view illustrating a structure of a capacitor in accordance with a fifteenth embodiment of the present invention.
Figure 23:
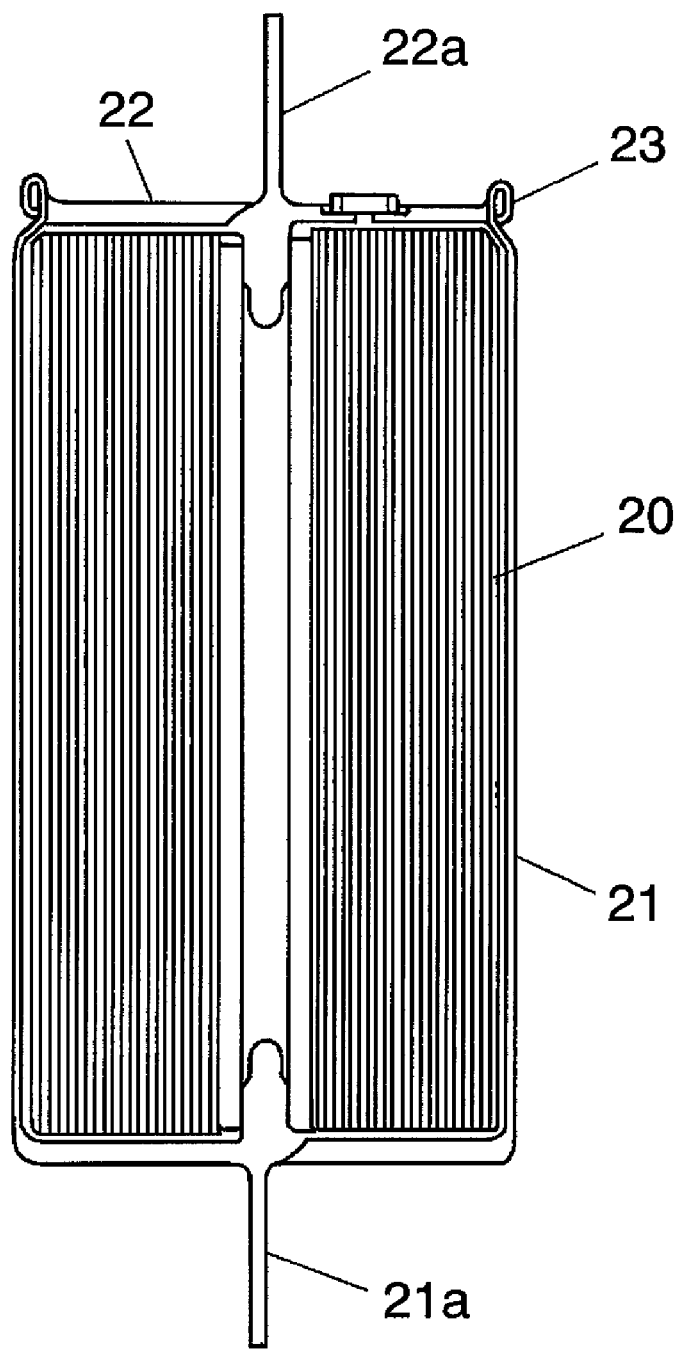
FIG. 23 shows a sectional view illustrating a structure of a conventional capacitor.
Figure 24:
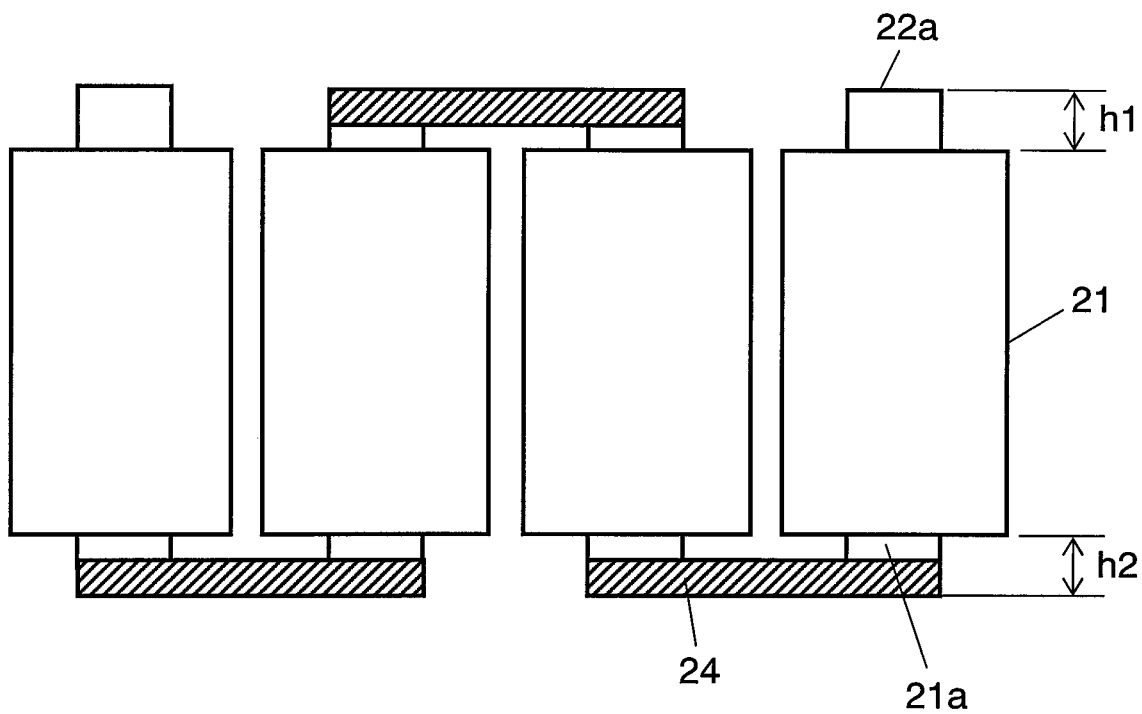
FIG. 24 shows a front view of a capacitor unit formed of a plurality of conventional capacitors linked to each other.
Figure 25:
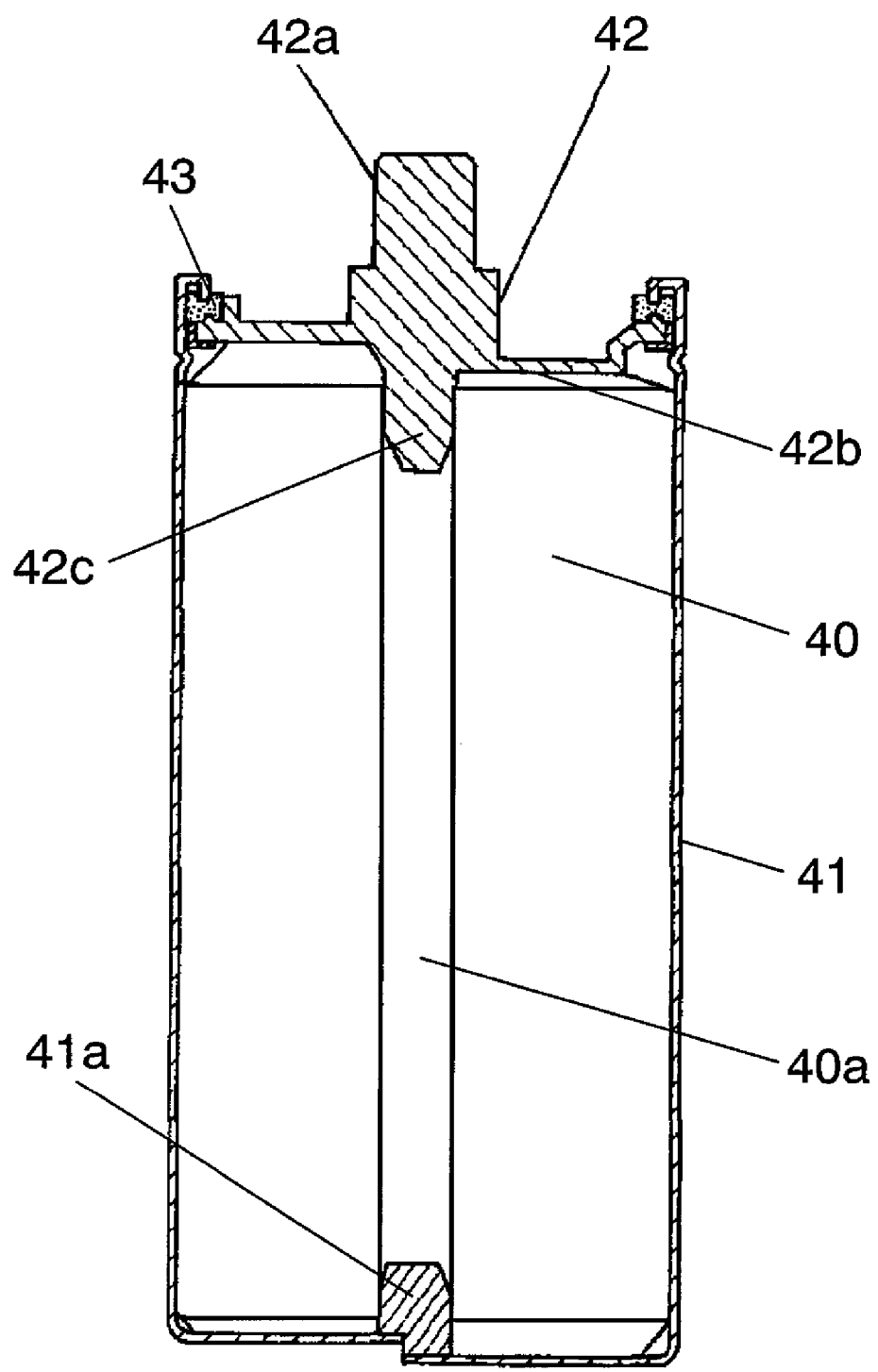
FIG. 25 shows a sectional view illustrating another structure of a conventional capacitor.
Figure 26A:
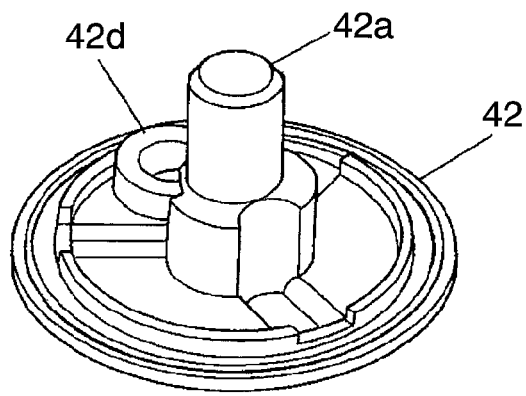
FIG. 26A shows a perspective view of a surface of a terminal plate to be used in the conventional capacitor.
Figure 26B:
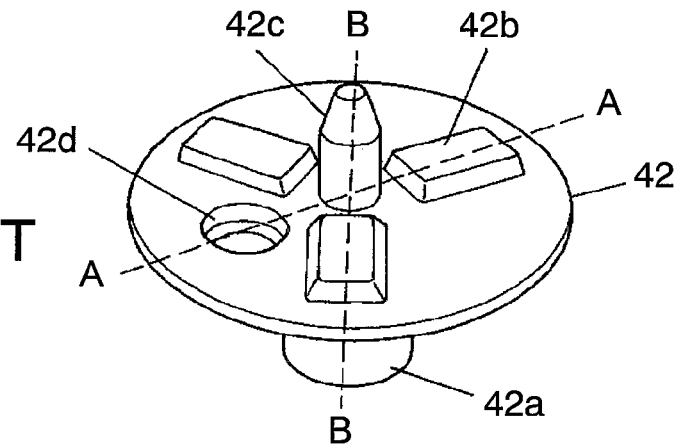
FIG. 26B shows a perspective view of an inner face of the terminal plate of the conventional capacitor.
Figure 26C:
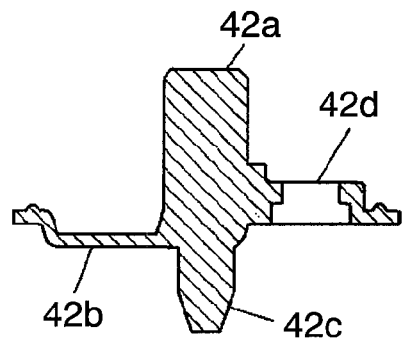
FIG. 26C shows a sectional view taken along line A-A in FIG. 26B.
Figure 26D:
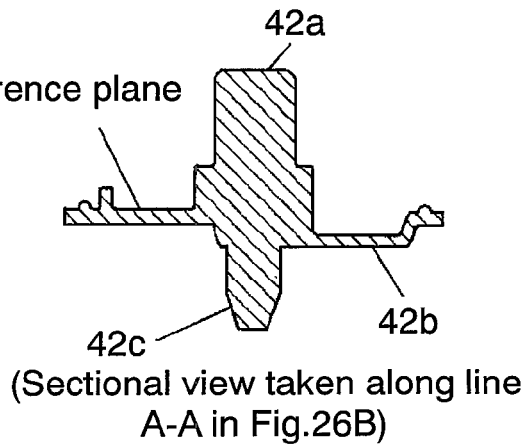
FIG. 26D shows a sectional view taken along line B-B in FIG. 26B.

FIG. 22 shows a front sectional view illustrating a structure of a capacitor in accordance with the 15th embodiment of the present invention. In FIG. 22, heat-shrinkable resin film 89 sheathes two capacitors 81A and 81B, so that the joint of the two capacitors becomes more stable.

As discussed previously, the capacitors in accordance with embodiments 13-15 can reduce a coupling space by half between respective capacitors when plural capacitors are linked to each other to form a capacitor unit, so that the capacitor unit can be downsized. Those capacitors are useful advantageously for regenerating batteries of hybrid cars and fuel-cell powered vehicles, or for power storage.

The structures, operations and advantages of the present invention are demonstrated in embodiments 1-15. Each one of the embodiment presents, a capacitor which can be downsized, whose capacitance value can be increased, and whose resistance can be decreased, and also presents a method of manufacturing the same capacitors.

INDUSTRIAL APPLICABILITY

The capacitor of the present invention allows its capacitor element to be brought out the anode and the cathode from the end faces of the element directly without using any lead member, so that a lower resistance can be expected. The anode and the cathode can be brought out through a terminal provided to a terminal plate and through a metal housing, so that this structure can reduce a coupling space by half between respective capacitors when plural capacitors are linked to each other to form a capacitor unit. The capacitor unit thus can be downsized. Those capacitors are useful advantageously for regenerating batteries of hybrid cars and fuel-cell powered vehicles, or for power storage, so that a high industrial applicability can be expected.

The invention claimed is:
1. A capacitor comprising:
  a capacitor element including an anode and a cathode, and
    a separator intervening between the anode and the cathode, wherein the anode and the cathode are rolled together with the separator, so that the capacitor element is formed such that it includes a hollow section and the anode and the cathode are oriented in opposite directions, and wherein each of the anode and the cathode comprises a polarized electrode layer formed on a current collecting unit made of metal foil;

a cylindrical metal housing having a bottom and enclosing the capacitor element and driving electrolyte, wherein one of the anode and the cathode of the capacitor element is coupled to an inner face of the bottom of the cylindrical metal housing; and a terminal plate having an inner face coupled to the other of the anode and the cathode of the capacitor element, said terminal plate sealing an opening of the metal housing, wherein the inner face of the terminal plate is referred to as a reference plane, and the reference plane is protruded toward an outer surface side leaving a plurality of belt-like coupling sections which extend from a rim toward a center of the terminal plate, and the terminal plate has a protrusion to be fitted into the hollow section of the capacitor element, and the terminal plate also has a terminal at a center of its outer surface for external connection, so that said one of the anode and the cathode of the capacitor element is brought out through the metal housing and said other of the anode and the cathode of the capacitor element is brought out through the terminal of the terminal plate, and wherein the terminal plate has a rotation stopper formed of at least one of a dint and a protrusion on the outer surface.

2. A capacitor comprising:

a capacitor element including an anode and a cathode, and a separator intervening between the anode and the cathode, wherein the anode and the cathode are rolled together with the separator, so that the capacitor element is formed such that it includes a hollow section and the anode and the cathode are oriented in opposite directions, and wherein each of the anode and the cathode comprises a polarized electrode layer formed on a current collecting unit made of metal foil;

a cylindrical metal housing having a bottom and enclosing the capacitor element and driving electrolyte, wherein one of the anode and the cathode of the capacitor element is coupled to an inner face of the bottom of the cylindrical metal housing; and a terminal plate having an inner face coupled to the other of the anode and the cathode of the capacitor element, said terminal plate sealing an opening of the metal housing, wherein the inner face of the terminal plate is referred to as a reference plane, and the reference plane is protruded toward an outer surface side leaving a plurality of belt-like coupling sections which extend from a rim toward a center of the terminal plate, and the terminal plate has a protrusion to be fitted into the hollow section of the capacitor element, and the terminal plate also has a terminal at a center of its outer surface for external connection, so that said one of the anode and the cathode of the capacitor element is brought out through the metal housing and said other of the anode and the cathode of the capacitor element is brought out through the terminal of the terminal plate, and wherein the terminal plate includes a safety-valve mounting hole which also functions as an inlet for the driving electrolyte, and wherein the capacitor element has a recess which receives in a non-contact manner a safety valve to be fitted to the safety-valve mounting hole.

3. A capacitor comprising:

a capacitor element including an anode and a cathode, and a separator intervening between the anode and the cathode, wherein the anode and the cathode are rolled together with the separator, so that the capacitor element is formed such that it includes a hollow section and the anode and the cathode are oriented in opposite directions, and wherein each of the anode and the cathode comprises a polarized electrode layer formed on a current collecting unit made of metal foil;

a cylindrical metal housing having a bottom and enclosing the capacitor element and driving electrolyte, wherein one of the anode and the cathode of the capacitor element is coupled to an inner face of the bottom of the cylindrical metal housing; and a terminal plate having an inner face coupled to the other of the anode and the cathode of the capacitor element, said terminal plate sealing an opening of the metal housing, wherein the inner face of the terminal plate is referred to as a reference plane, and the reference plane is protruded toward an outer surface side leaving a plurality of belt-like coupling sections which extend from a rim toward a center of the terminal plate, and the terminal plate has a protrusion to be fitted into the hollow section of the capacitor element, and the terminal plate also has a terminal at a center of its outer surface for external connection, so that said one of the anode and the cathode of the capacitor element is brought out through the metal housing and said other of the anode and the cathode of the capacitor element is brought out through the terminal of the terminal plate, and wherein the terminal plate includes unitarily an annular rising section at a rim of the outer surface and a winding processing section extending radially outwardly as a brim from an upper end of the rising section, and the winding processing section and the opening of the metal housing are wound together for sealing, and wherein a bottom face at the bottom of the cylindrical metal housing includes a terminal for external connection.

4. The capacitor of claim 3, wherein one end of the current collecting unit of each of the anode and the cathode has an exposed section, and wherein the anode and the cathode are arranged such that the exposed sections of the current collecting units thereof are oriented in opposite directions relative to each other.

5. The capacitor of claim 3, wherein the anode and the cathode are shifted in opposite directions from each other such that their ends respectively protrude in opposite directions.

6. A capacitor comprising:

a capacitor element including an anode and a cathode, and a separator intervening between the anode and the cathode, wherein the anode and the cathode are rolled together with the separator, so that the capacitor element is formed such that it includes a hollow section and the anode and the cathode are oriented in opposite directions, and wherein each of the anode and the cathode comprises a polarized electrode layer formed on a current collecting unit made of metal foil;

a cylindrical metal housing having a bottom and enclosing the capacitor element and driving electrolyte, wherein one of the anode and the cathode of the capacitor element is coupled to an inner face of the bottom of the cylindrical metal housing; and a terminal plate having an inner face coupled to the other of the anode and the cathode of the capacitor element, said terminal plate sealing an opening of the metal housing, wherein the inner face of the terminal plate is referred to as a reference plane, and the reference plane is protruded toward an outer surface side leaving a plurality of belt-like coupling sections which extend from a rim toward a center of the terminal plate, and the terminal plate has a protrusion to be fitted into the hollow section of the capacitor element, and the terminal plate also has a terminal at a center of its outer surface for external connection, so that said one of the anode and the cathode of the capacitor element is brought out through the metal housing and said other of the anode and the cathode of the capacitor element is brought out through the terminal of the terminal plate, and wherein the terminal for external connection provided at the center of the outer surface of the terminal plate includes a tip that is tapered to form a coupling section to be deformed for coupling with a coupling member.

* * * * *